US011599555B2

(12) United States Patent
Patangia et al.

(10) Patent No.: US 11,599,555 B2
(45) Date of Patent: *Mar. 7, 2023

(54) DATA MANIFEST AS A BLOCKCHAIN SERVICE

(71) Applicant: Bank of America Corporation, Charlotte, NC (US)

(72) Inventors: Vishal Patangia, West Hills, CA (US); Mark Standring, Los Angeles, CA (US); Vasudevan Atteeri, Newbury Park, CA (US); Matthew Steed, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,939

(22) Filed: Oct. 5, 2021

(65) Prior Publication Data

US 2022/0027384 A1 Jan. 27, 2022

Related U.S. Application Data

(63) Continuation of application No. 16/038,923, filed on Jul. 18, 2018, now Pat. No. 11,204,939.

(51) Int. Cl.
| G06F 16/27 | (2019.01) |
| H04L 9/06 | (2006.01) |
| G06F 16/182 | (2019.01) |
| H04L 9/00 | (2022.01) |

(52) U.S. Cl.
CPC .......... G06F 16/27 (2019.01); G06F 16/1834 (2019.01); H04L 9/0643 (2013.01); H04L 9/50 (2022.05)

(58) Field of Classification Search
CPC ................ G06F 16/27; G06F 16/1834; H04L 9/0643; H04L 9/50
USPC ............................................................ 726/6
See application file for complete search history.

(56) References Cited

U.S. PATENT DOCUMENTS

| 5,964,877 | A | 10/1999 | Victor et al. |
| 6,084,934 | A | 7/2000 | Garcia et al. |
| 9,971,900 | B1 * | 5/2018 | Koropoff .............. H04L 9/0643 |
| 2003/0226021 | A1 * | 12/2003 | Chiu ...................... H04L 63/12 |
| | | | 713/181 |
| 2004/0059964 | A1 * | 3/2004 | Grover ................... H04L 69/40 |
| | | | 714/47.1 |

(Continued)

*Primary Examiner* — Thanh T Le
(74) *Attorney, Agent, or Firm* — Banner & Witcoff, Ltd.

(57) ABSTRACT

Methods and systems for providing data manifests as a service (DMAAS) are described herein. A first computing system, may generate a first data manifest comprising a first count parameter and a first hash parameter associated with a first data exchange transaction between the first computing system and a second computing system, store the first data manifest to a blockchain data store and transfer a data payload of the first data exchange transaction. The second computing system may analyze the data payload received via the transport mechanism, generate a second data manifest including a second count parameter and a second hash parameter and store the second data manifest to the blockchain data store. A DMAAS computing system facilitates access to the blockchain data store, identifies transmission errors, and triggers acceptance of data at the second computing system upon a successful data exchange transaction.

20 Claims, 8 Drawing Sheets

(56) References Cited

U.S. PATENT DOCUMENTS

| | | | |
|---|---|---|---|
| 2010/0058148 A1 | 3/2010 | Lu et al. | |
| 2013/0254878 A1 | 9/2013 | Clarke et al. | |
| 2014/0095902 A1* | 4/2014 | Rorai | H04L 12/6418 713/320 |
| 2014/0193154 A1* | 7/2014 | Graham | H04J 14/0227 398/79 |
| 2014/0208420 A1 | 7/2014 | Mraz et al. | |
| 2015/0006931 A1* | 1/2015 | Cooper | G06F 1/3203 713/323 |
| 2015/0172298 A1* | 6/2015 | Otsuka | H04L 63/08 726/30 |
| 2015/0195280 A1* | 7/2015 | Toyonaga | H04L 63/0428 713/155 |
| 2015/0278520 A1* | 10/2015 | Mraz | G06F 21/567 726/23 |
| 2015/0358323 A1* | 12/2015 | Mraz | G06F 16/183 726/4 |
| 2016/0028738 A1* | 1/2016 | Xie | H04L 63/123 726/4 |
| 2016/0065595 A1* | 3/2016 | Kim | H04L 63/1408 726/1 |
| 2016/0078228 A1* | 3/2016 | Guo | G06F 21/564 726/24 |
| 2017/0013047 A1 | 1/2017 | Hubbard et al. | |
| 2017/0032015 A1* | 2/2017 | Shkapenyuk | G06F 16/283 |
| 2017/0103167 A1 | 4/2017 | Shah | |
| 2018/0089758 A1* | 3/2018 | Stradling | G06Q 40/04 |
| 2019/0114182 A1* | 4/2019 | Chalakudi | H04L 63/0435 |
| 2019/0116142 A1* | 4/2019 | Chalakudi | H04L 67/104 |
| 2019/0147431 A1* | 5/2019 | Galebach | H04L 9/50 705/44 |
| 2019/0182367 A1* | 6/2019 | Kim | H04L 63/062 |
| 2019/0318433 A1* | 10/2019 | McGee | H04L 9/0643 |
| 2019/0339668 A1* | 11/2019 | Biernat | H04L 9/3239 |
| 2020/0136843 A1* | 4/2020 | Chalakudi | H04L 63/0442 |
| 2021/0152532 A1* | 5/2021 | Reinhold | H04L 9/0643 |

* cited by examiner

DATA MANIFEST AS A BLOCKCHAIN SERVICE

CROSS REFERENCE TO RELATED APPLICATIONS

This application is a continuation of patent application Ser. No. 16/038,923 entitled "Data Manifest as a Blockchain Service" and filed on Jul. 18, 2018, which is incorporated by reference in its entirety.

FIELD

Aspects described herein generally relate to decentralized peer-to-peer (e.g., P2P) computer systems specialized for managing data communications between the P2P computer systems. In particular, one or more aspects of the disclosure relate to managing data manifests based on or using a blockchain.

BACKGROUND

As computer systems are increasingly utilized to provide automated and electronic services, such computer systems may obtain and maintain increasing amounts of various types of information. In many cases, enterprises may have many applications (e.g., hundreds, thousands) sharing data over the network. In many cases, these applications may be developed by multiple development groups and at different times such that any data management standards may differ between applications. As data sharing has become more common, different industry or governmental groups may audit enterprises to enforce certain data management standards. Therefore, enterprises must store a record of each data exchange transaction between the applications on their network to ensure the safety, security, and accuracy of this information. Because, in many instances, no overarching electronic data management standard may be followed by each application, a need was recognized for improved data management techniques for management of data exchange transactions in response to data contracts between a data provider and a data consumer, ensuring accuracy of data manifests corresponding to each data exchange transaction between the data provider and the data consumer in a centralized location such that the data record can be stored in an immutable format.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and methods to facilitate, monitor, and provide an immutable data record for a plurality of data transactions between different applications communicatively coupled via a network, such as an enterprise network. In some cases, the systems and/or methods may be accomplished using application programming interface (API) functions implemented at one or more data provider computing system, one or more data consumer computing systems, and a data management as a service (DMAAS) computing systems configured to centrally coordinate entry of data transactions records into a blockchain data store.

An illustrative method may include a first computing system, generating a first data manifest comprising a first count parameter and a first hash parameter associated with a first data exchange transaction between the first computing system and a second computing system, storing the first data manifest to a blockchain data store and transferring to the second computing system via a transport mechanism, a data payload of the first data exchange transaction. The second computing system may be configured for analyzing the data payload received via the transport mechanism, generating a second data manifest including a second count parameter and a second hash parameter and storing the second data manifest to the blockchain data store. The DMAAS computing system may facilitate the storing of data to the blockchain data store through use of API functions implemented by one or more applications at the first computing system and the second computing system. The DMAAS computing system may be configured for analyzing the first data manifest and the second data manifest retrieved from the blockchain and triggering the second computing system to release the data payload to a data consuming application when the analysis by the DMAAS computing system indicates a successful transfer.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
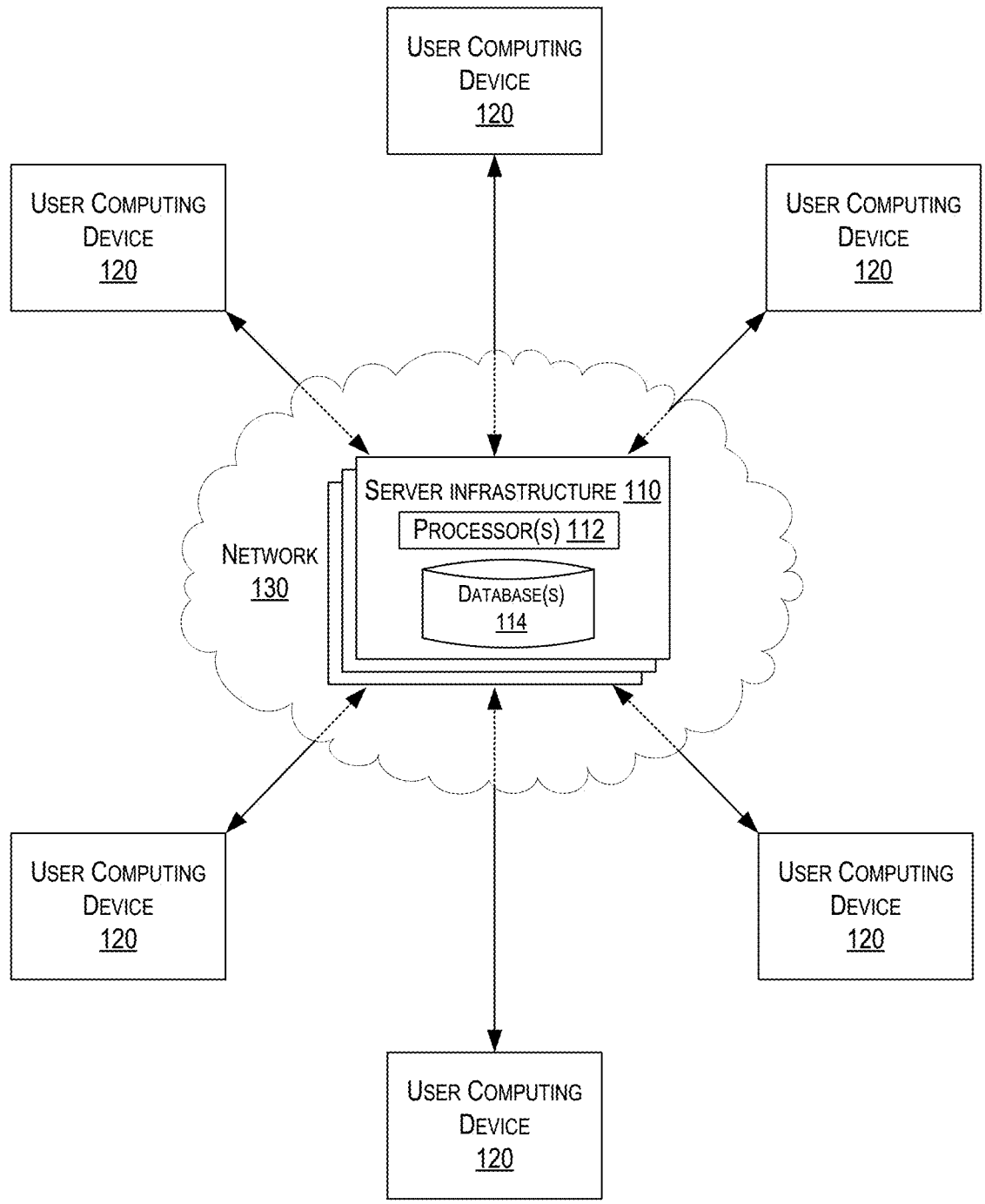
FIG. 1 depicts an illustrative example of centralized computer system in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards data manifests as a service utilizing the benefits of blockchain, P2P communications, immutable records of data communications and a trusted source of records regarding data communications over the P2P computer systems.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

In general, a user may access the decentralized P2P system through a specialized "wallet" that serves to uniquely identify the user and enable the user to perform functions related to the decentralized P2P network. Through the wallet, the user may be able to hold tokens, funds, and/or any other asset or transaction (e.g., a data contract, a data manifest, and the like) associated with the decentralized P2P system. Furthermore, the user may be able to use the wallet to request performance of network-specific functions related to the decentralized P2P system such as fund, token, asset, and/or data transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

In an illustrative example of blockchain use, a first user may have a wallet, which reflects that the first user has data (e.g., five tokens) associated with the decentralized P2P system. The user may provide a request to the decentralized P2P system to transfer the data (e.g., the five tokens) to a second user who also has a wallet. The various computing devices forming the decentralized P2P computing system may perform the request and transfer the data from the wallet of the first user to the wallet of the second user. In doing so, a block may be created by the various computing devices of the decentralized P2P computing system. The block may store data indicating that the data was transferred from the wallet of the first user to the wallet of the second user. The various computing devices may add the block to the blockchain. At such a point, the wallet of the first user may reflect the transfer of the data to the wallet of the second user. In the illustrative example, the first user's wallet may indicate a balance of zero tokens. The wallet of the second user, however, may also reflect the transfer of the data (e.g., the five tokens) and may indicate a balance of five tokens.

In more detail, the decentralized P2P system may be specialized for managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network and aggregated through execution of the one or more digital cryptographic hash functions and by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, data communications between computing systems, cryptocurrency, digital content storage and delivery, entity authentication and authorization, digital identity, marketplace creation and operation, internet of things (e.g., IoT), prediction platforms, currency exchange and remittance, P2P transfers, ride sharing, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices that are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices that are not participating as nodes within the decentralized public network.

Further, a "full node" or "full node computing device," as used herein, may describe a computing device in a decentralized system that operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions that are able to be performed by nodes of a decentralized P2P network. In some arrangements, the data generated in performing network-specific functions may or may not be stored on a blockchain associated with the decentralized P2P network. Examples of network functions may include application programming interface (API) functions that may include functions such as "smart contract operations" and "balance sheet transaction." Additional API functions may include functions to manage data contract information and/or to manage data manifest information. A smart contract operation, as used herein, may describe one or more operations associated with a "smart contract," which may be one, or more algorithms and/or programs stored on a blockchain and identified by one or more wallets and/or public keys within a decentralized P2P network. In performing a smart contract operation, each full node computing device within a decentralized P2P network may identify a block within a blockchain comprising the smart contract and, responsive to identifying the block associated with the smart contract, may execute the one or more algorithms and/or programs of the smart contract. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms that are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network. A wallet may be associated with a public key, which may serve to identify the wallet. In requesting performance of network operations, a private key associated with the wallet may be used to digitally sign the network operation requests.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network. Additionally, implementation of the blockchain data structure allows management of electronic data transactions between two or more computing systems to maintain data integrity and security based on terms of a data exchange contract.

Computing Architectures

FIG. 1 depicts an illustrative example of centralized computer system 100 in accordance with one or more illustrative aspects described herein. The centralized computer system 100 may comprise one or more computing devices including at least server infrastructure 110 and user computing devices 120. Each of the user computing devices 120 may be configured to communicate with the server infrastructure 110 through the network 130. In some arrangements, the centralized computer system 100 may include additional computing devices and networks that are not depicted in FIG. 1, which also may be configured to interact with the server infrastructure 110 and, in some instances, the user computing devices 120.

The server infrastructure 110 may be associated with a distinct entity such as a business organization, a school, a government organization, and the like. The server infrastructure 110 may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like. The server infrastructure 110 may include computing hardware and software that may host various data and applications for performing tasks of the centralized entity and for interacting with the user computing devices 120, as well as other computing devices. For example, each of the computing devices included in the server infrastructure 110 may include at least one or more processors 112 and one or more databases 114 that may be stored in memory of the one or more computing devices of the server infrastructure 110. Through execution of computer-readable instructions stored in memory by the one or more processors 112, the computing devices of the server infrastructure 110 may be configured to perform functions of the centralized entity and store the data generated during the performance of such functions in the databases 114.

In some arrangements, the server infrastructure 110 may include and/or be part of an enterprise information technology infrastructure and may host a plurality of enterprise applications, enterprise databases, and/or other enterprise resources. Such applications may be executed on the one or more computing devices included in the server infrastructure 110 using distributed computing technology and/or the like. In some instances, the server infrastructure 110 may include a relatively large number of servers that may support operations of a particular enterprise or organization, such as a financial institution. The server infrastructure 110, in this illustrative example, may generate a single centralized ledger for data received from the various user computing devices 120, which may be stored in the databases 114.

Each of the user computing devices 120 may be configured to interact with the server infrastructure 110 through the network 130. In some instances, one or more of the user computing devices 120 may be configured to receive and transmit information corresponding to system requests through particular channels and/or representations of webpages and/or applications associated with the server infrastructure 110. The system requests provided by the user computing devices 120 may initiate the performance of particular computational functions such as data and/or file transfers at the server infrastructure 110. In such instances, the one or more of the user computing devices may be internal computing devices associated with the particular entity corresponding to the server infrastructure 110 and/or may be external computing devices which are not associated with the particular entity.

As stated above, the centralized computer system 100 also may include one or more networks, which may interconnect one or more of the server infrastructure 110 and the one or more user computing devices 120. For example, the centralized computer system 100 may include a network 130. The network 130 may include one or more sub-networks (e.g., local area networks (LANs), wide area networks (WANs), or the like). Furthermore, the centralized computer system 100 may include a local network configured to interlink each of the computing devices comprising the server infrastructure 110.

Furthermore, in some embodiments, the centralized computer system 100 may include a plurality of computer systems arranged in an operative networked communication arrangement with one another through a network, which may interface with the server infrastructure 110, the user computing devices 120, and the network 130. The network 130 may be a system specific distributive network receiving and distributing specific network feeds and identifying specific network associated triggers. The network 130 may also be a global area network (GAN), such as the Internet, a wide area network (WAN), a local area network (LAN), or any other type of network or combination of networks. The network 130 may provide for wireline, wireless, or a combination wireline and wireless communication between devices on the network 130.

In the centralized computer system 100 described in regard to FIG. 1, the server infrastructure 110 may serve as a central authority which manages at least a portion of the computing data and actions performed in relation to the particular entity associated with the server infrastructure 110. As such, the server infrastructure 110 of the centralized computer system 100 provides a single point of failure which, if compromised by a malicious attacker, can lead to data tampering, unauthorized data disclosure, and/or loss of operative control of the processes performed by the server infrastructure 110 in relation to the particular entity associated with the server infrastructure 110. In such a centralized construct in which a single point of failure (e.g., the server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
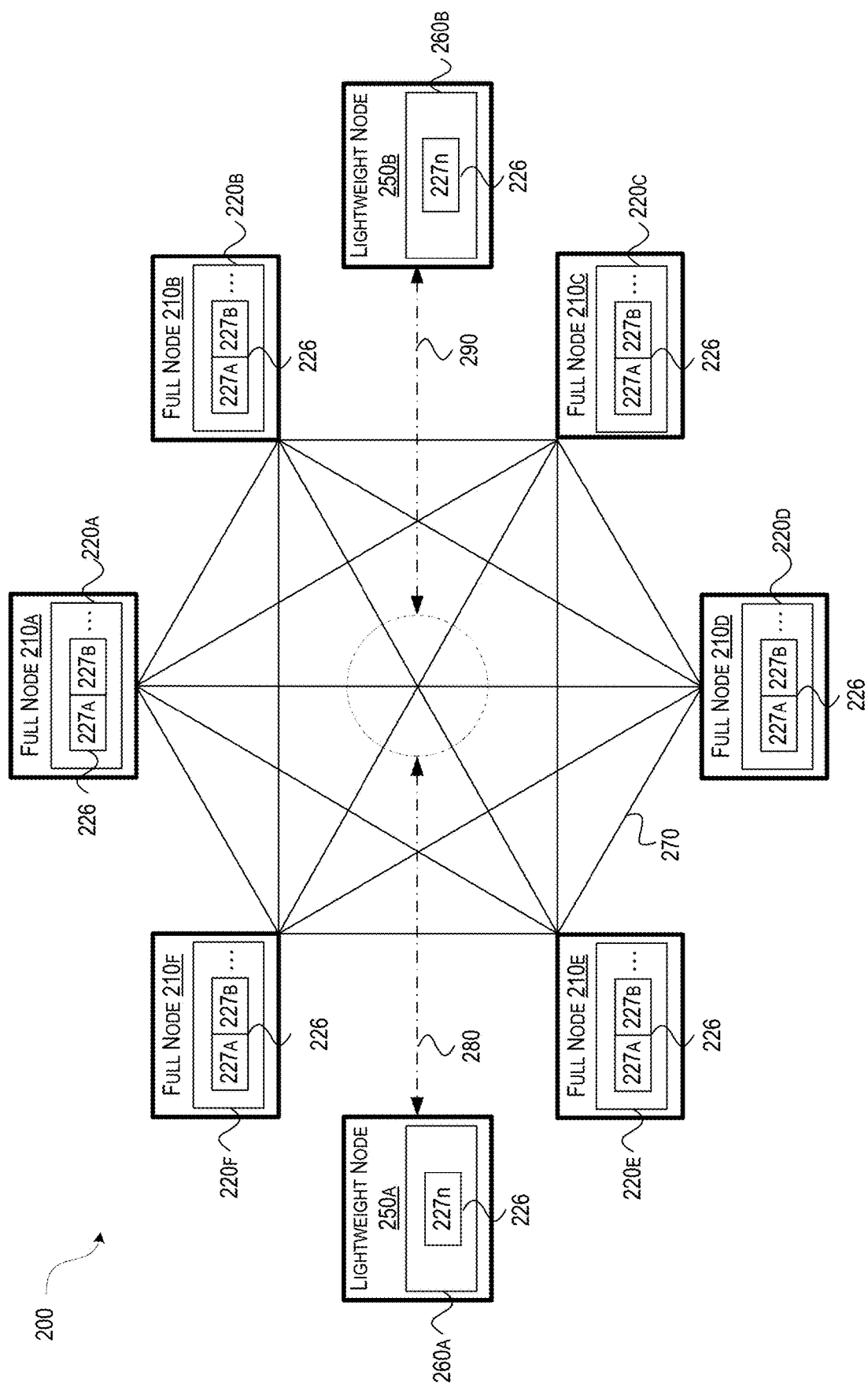
FIG. 2 depicts an illustrative example of decentralized P2P computer system that may be used in accordance with one or more illustrative aspects described herein.

FIG. 2 depicts an illustrative example of a decentralized P2P computer system 200 that may be used in accordance with one or more illustrative aspects described herein. The decentralized P2P computer system 200 may include a plurality of full node computing devices 210A, 210B, 210C, 210D, 210E, and 210F and one or more lightweight node computing devices 250A and 250B, which may be respectively similar to the full node computing device 210 described in regard to FIG. 3A and a lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in the decentralized P2P computer system 200. Accordingly, any additional full node computing devices and/or lightweight node computing devices may respectively perform in the manner described below in regard to the full node computing devices 210A-210F and the lightweight node computing devices 250A and 250B in the decentralized P2P computer system 200.

Each of the full node computing devices 210A-210F may operate in concert to create and maintain the decentralized P2P network 270 of the decentralized P2P computer system 200. In creating the decentralized P2P network 270 of the decentralized P2P computer system 200, processors, ASIC devices, and/or graphics processing units (e.g., GPUs) of each full node computing device 210A-210F may execute network protocols that may cause each full node computing device 210A-210F to form a communicative arrangement with the other full node computing devices 210A-210F in the decentralized P2P computer system 200 and thereby create the decentralized P2P network 270. Furthermore, the execution of network protocols by the processors, ASIC devices, and/or GPUs of the full node computing devices 210A-210F may cause the corresponding full node computing devices 210A-210F to execute network functions related to a blockchain 226 and maintain the decentralized P2P network 270.

The lightweight node computing devices 250A and 250B may request execution of network functions related to the decentralized P2P network 270. In order to request execution of network functions, such as balance sheet transaction and/or smart contract operations, processors of the lightweight node computing devices 250A and 250B may execute network commands to broadcast the network functions to the decentralized P2P network 270 comprising the full node computing devices 210A-210F.

For example, the lightweight node computing device 250A may request execution of a balance sheet transaction related to the decentralized P2P network 270, which may entail a data transfer from a wallet associated with the lightweight node computing device 250A to a wallet associated with the lightweight node 250B. In doing so, processors of the lightweight node computing device 250A may execute network commands to broadcast a balance sheet transaction network function request 280 to the decentralized P2P network 270. The balance sheet transaction network function request 280 may include details about the data transfer such as data type and amount, as well as a data transfer amount to the full node computing devices 210A-201F of the decentralized P2P network 270 for executing the balance sheet transaction network function request 280. The balance sheet transaction network function request 280 may further include the public key associated with the wallet of the lightweight node computing device 250B. Processors of the lightweight node computing device 250A may execute digital signature algorithms to digitally sign the balance sheet transaction network function request 280 with the private key associated with the wallet of the lightweight node computing device 250A.

At the decentralized P2P network 270, the balance sheet transaction network function request 280 may be broadcasted to each of the full node computing devices 210A-210F through execution of network protocols by the full node computing devices 210A-210F. To execute the balance sheet transaction network function request 280 and maintain inter-nodal agreement of the state of the blockchain 226, processors, ASIC devices, and/or GPUs of the full node computing devices 210A-210F may execute network protocols to receive broadcast of the network function through decentralized P2P network 270 and from lightweight node computing device 250A. Processors, ASIC devices, and/or GPUs of full node computing devices 210A-210F may execute hash functions to generate a digest of the balance sheet transaction network function request 280. The resultant digest of the balance sheet transaction network function request 280 may, in turn, be hashed with the block hash of the most immediately preceding block of the blockchain 226. Processors, ASIC devices, and/or GPUs of the full node computing devices 210A-210F may execute consensus algorithms to identify a numerical value (e.g., a nonce) corresponding to the particular executed consensus algorithm and related to the digest that combines the digest of the balance sheet transaction network function request 280 and the block hash of the most immediately preceding block of the blockchain 226.

For example, in embodiments in which the consensus algorithm is proof of work (e.g., PoW), processors, ASIC devices, and/or GPUs of the full node computing devices 210A-210F may perform a plurality of hashing operations to identify a nonce that, when hashed with the digest that combines the digest of the balance sheet transaction network function request 280 and the block hash of the most immediately preceding block of the blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and the block hash of the most immediately preceding block of the blockchain 226.

In embodiments in which the consensus algorithm is proof of stake (e.g., PoS), a private key associated with one of the full node computing devices 210A-210F may be pseudo-randomly selected, based on balance sheet holdings associated with the public keys of the full node computing devices 210A-210F, to serve as the nonce. For example, through execution of the PoS consensus algorithm, the full node computing devices 210A-210F are entered into a lottery in which the odds of winning are proportional to a balance sheet amount associated the wallet of each of the full node computing devices 210A-210F, wherein a larger balance sheet amount corresponds to a higher probability to win the lottery. The PoS consensus algorithm may cause a full node computing device from the full node computing devices 210A-210F to be selected, and the public key of the wallet of the selected full node computing device to be used as the nonce.

In embodiments in which the consensus algorithm is delegated proof of stake (e.g., DpoS), a group of delegates are chosen from the full node computing devices 210A-210F by each of computing devices 210A-210F, wherein full node computing devices 210A-210F are allowed to vote on delegates based on balance sheet holdings associated with the respective wallets. The full node computing devices 210A-210F, however, may not vote for themselves to be delegates. Once the group of delegates are chosen, the group of delegates from the full node computing devices 210A-210F select a public key associated with a wallet of one of the full node computing devices 210A-210F to serve as the nonce.

In embodiments in which the consensus algorithm is practical byzantine fault tolerance algorithm (e.g., PBFT), each of the full node computing devices 210A-210F are associated with a particular status and/or ongoing specific information associated with the respective public key of the full node computing devices 210A-201F. Each of the full node computing devices 210A-210F receive a message through the decentralized P2P network 270 based on network protocols. Based on the received message and particular status and/or ongoing specific information, each of the full node computing devices 210A-210F perform computational tasks and transmit a response to the tasks to each of the other full node computing devices 210A-210F. A public key of a wallet associated with a particular full node computing device from the full node computing devices 210A-210F is selected by each of the full node computing devices 210A-210F based on the response of the particular full node computing device best fulfilling criteria determined based on the network protocols.

The identification of the nonce enables processors, ASIC devices, and/or GPUs of the full node computing device from the full node computing devices 210A-210F corresponding to the nonce to create a new block with a block header (e.g., block hash), which is a digest that combines the digest of the balance sheet transaction network function request 280, the block hash of the most immediately preceding block, and the identified nonce. Processors, ASIC devices, and/or GPUs of the full node computing device from the full node computing devices 210A-210F may execute network protocols to add the new block to the blockchain 226 and broadcast the new block to the other full node computing devices in the decentralized P2P network 270. In some arrangements, the new block may also be time-stamped at a time corresponding to the addition to the blockchain 226. Furthermore, as a reward for adding the new block to the blockchain 226, the full node computing device from the full node computing devices 210A-210F may be allowed, per the network protocols, to increase balance sheet holdings associated with itself by a predetermined amount. In some arrangements, each of the full node computing devices 210A-210F may receive an equal portion of the data transfer amount specified by the lightweight node computing device 250A for executing the balance sheet transaction network function request 280. After the new block has been added to the blockchain 226, the balance sheet transaction network function request 280 may be considered to be executed and the data transfer from the wallet associated with the lightweight node computing device 250A to the wallet associated with the lightweight node 250B may be registered.

As stated above, in some arrangements, a plurality of network function requests may be broadcasted across the decentralized network P2P network 270. The processors, ASIC devices, and/or GPUs of full node computing devices 210A-210F may execute network protocols to receive broadcast of each of the network functions, including the balance sheet transaction network function request 280, through the decentralized P2P network 270 and from the requesting entities, including the lightweight node computing device 250A. The processors, ASIC devices, and/or GPUs of the full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including the balance sheet transaction network function request 280. The root digest of the requested network function may, in turn, be hashed with the block hash of the most immediately preceding block of the blockchain 226. The processors, ASIC devices, and/or GPUs of the full node computing devices 210A-210B may execute consensus algorithms in the manner described above to identify a nonce corresponding to the particular executed consensus algorithm and related to the digest that combines the root digest of the requested network functions and the block hash of the most immediately preceding block of the blockchain 226. The identification of the nonce enables the processors, ASIC devices, and/or GPUs of the full node computing device from the full node computing devices 210A-210F to create a new block with a block header (e.g., block hash), which is a digest that combines the root digest of the network function requests, the block hash of the most immediately preceding block, and the identified nonce. The processors, ASIC devices, and/or GPUs of the full node computing device from the full node computing devices 210A-210F may execute network protocols to add the new block to the blockchain 226 and broadcast the new block to the other full node computing devices in the decentralized P2P network 270. In some arrangements, the new block may also be time-stamped at a time corresponding to the addition to the blockchain 226. Furthermore, as a reward for adding the new block to the blockchain 226, the full node computing device from the full node computing devices 210A-210F may be allowed, per the network protocols, to increase a balance sheet holdings amount associated with itself by a predetermined amount. In some arrangements, each of the full node computing devices 210A-210F may receive an equal portion of the data transfer amount specified by each of the network function requests. After the new block has been added to the blockchain 226, each of the network functions requests, including the balance sheet transaction network function request 280, may be considered to be executed and the data transfer from the private/public key associated with the lightweight node computing device 250A to the private/public key associated with the lightweight node 250B may be registered.

While the description provided above is made in relation to a balance sheet transaction involving the lightweight node computing device 250A and the lightweight node computing device 250B, it is to be understood that balance sheet transactions are not limited to the lightweight node computing device 250A and the lightweight node computing device 250B, but rather may be made across any of the full node computing devices and/or lightweight node computing devices in the decentralized P2P system 200.

In some cases, the lightweight node computing device 250B may request a smart contract operation related to the decentralized P2P network 270, which may facilitate a dual data transfer between a wallet associated with the lightweight node computing device 250B and a wallet associated with another node in the decentralized P2P network 270, such as the lightweight node computing device 250A, based on fulfillment of programmatic conditions established by a smart contract. Processors of the lightweight node computing device 250B may execute network commands to the broadcast smart contract operation network function request 290 to the decentralized P2P network 270. The smart contract operation network function request 290 may include details about the data transfer such as data type and amount, as well as a data transfer amount to the full node computing devices 210A-210F of the decentralized P2P network 270 for executing the smart contract corresponding to the smart contract operation network function request 290. The smart contract operation network function request 290 may further include the public key associated with the smart contract. The processors of lightweight node computing device 250B may execute digital signature algorithms to digitally sign the smart contract operation network function request 290 with the private key associated with the wallet of the lightweight node computing device 250B.

At the decentralized P2P network 270, the smart contract operation network function request 290 may be broadcasted to each of the full node computing devices 210A-210F through execution of network protocols by the full node computing devices 210A-210F. To execute the smart contract operation network function request 290 and maintain inter-nodal agreement of the state of the blockchain 226, the processors, ASIC devices, and/or GPUs of the full node computing devices 210A-210F may execute network protocols to receive broadcast of the network function through a decentralized P2P network 270 and from the lightweight node computing device 250B. The processors, ASIC devices, and/or GPUs of the full node computing devices 210A-210F may execute hash functions to generate a digest of the smart contract operation network function request 290. The resultant digest of the smart contract operation network function request 290, in turn, may be hashed with the block hash of the most immediately preceding block of the blockchain 226. The processors, ASIC devices, and/or GPUs of the full node computing devices 210A-210F may execute consensus algorithms to identify a nonce corresponding to the particular executed consensus algorithm and related to the digest that combines the digest of the smart contract operation network function request 290 and the block hash of the most immediately preceding block of the blockchain 226.

The identification of the nonce enables the processors, ASIC devices, and/or GPUs of the full node computing device from the full node computing devices 210A-210F to create a new block with a block header (e.g., block hash), which is a digest that combines the smart contract operation network function request 290, the block hash of the most immediately preceding block, and the identified nonce. The processors, ASIC devices, and/or GPUs of the full node computing device from the full node computing devices 210A-210F may execute network protocols to add the new block to the blockchain 226 and broadcast the new block to the other full node computing devices in the decentralized P2P network 270. In some arrangements, the new block may also be time-stamped at a time corresponding to the addition to the blockchain 226. Furthermore, as a reward for adding the new block to the blockchain 226, the full node computing device from the full node computing devices 210A-210F may, per the network protocols, increase a balance sheet holdings amount associated with itself by a predetermined amount. In some arrangements, each of the full node computing devices 210A-210F may receive an equal portion of the data transfer amount specified by the lightweight node computing device 250B for executing the smart contract operation network function request 290. After the new block has been added to the blockchain 226, the smart contract operation request 290 may be considered to be executed and the data transfer from the wallet associated with the lightweight node computing device 250B to the public key associated with the smart contract may be registered.

The smart contract may be configured to hold the data transfer from the wallet associated with the lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to the smart contract operation request 290 may be one or more algorithms and/or programs stored on a block of the blockchain 226. The smart contract may be identified by one or more wallets and/or public keys within the decentralized P2P network 270. The lightweight node computing device 250B may transmit the smart contract operation network function request 290 to the decentralized P2P network 270, which may cause execution of the corresponding smart contract that facilitates a dual data transfer between a wallet associated with the lightweight node computing device 250B and a wallet associated with another node in the decentralized P2P network 270, such as the lightweight node computing device 250A, based on fulfillment of programmatic conditions established by the smart contract. In the processes of adding the block comprising smart contract operation request 290 to the blockchain 226, each of the full node computing devices 210A-210F may identify the block within the blockchain 226 comprising the smart contract, associate the data transfer entailed by the smart contract operation request 290 with the smart contract, and execute the one or more algorithms and/or programs of the smart contract. In this instance, given that the smart contract facilitates a dual data transfer and that data transfer has yet to be received from another node (e.g., the lightweight node computing device 250A), each of the full node computing devices 210A-210F may execute the smart contract without fulfillment of the programmatic conditions established by the smart contract. Accordingly, the funds transferred by the lightweight node computing device 250B may remain in the smart contract until the data transfer from the other node is also associated with the smart contract.

Moving forward, the lightweight node computing device 250A may also request a smart contract operation related to the decentralized P2P network 270, which may conclude the dual data transfer between the wallet associated with the lightweight node computing device 250A and the wallet associated with the lightweight node computing device 250B. The processors of the lightweight node computing device 250A may execute network commands to broadcast the smart contract operation network function request 290 to the decentralized P2P network 270. The smart contract operation network function request 290 may include details about the data transfer such as data type and amount, as well as a data transfer amount to the full node computing devices 210A-210F of the decentralized P2P network 270 for executing the smart contract corresponding to the smart contract operation network function request 290. The smart contract operation network function request 290 may further include the public key associated with the smart contract. The processors of the lightweight node computing device 250A may execute digital signature algorithms to digitally sign the smart contract operation network function request 290 with the private key associated with the wallet of the lightweight node computing device 250A.

At the decentralized P2P network 270, the smart contract operation network function request 290 may be broadcasted to each of the full node computing devices 210A-210F through execution of network protocols by full node computing devices 210A-210F. In order to execute the smart contract operation network function request 290 and maintain inter-nodal agreement as to the state of the blockchain 226, the processors, ASIC devices, and/or GPUs of the full node computing devices 210A-210F may execute network protocols to receive broadcast of the network function through the decentralized P2P network 270 and from the lightweight node computing device 250A. The processors, ASIC devices, and/or GPUs of the full node computing devices 210A-210F may execute hash functions to generate a digest of the smart contract operation network function request 290. The resultant digest of the smart contract operation network function request 290, in turn, may be hashed with the block hash of the most immediately preceding block of the blockchain 226. The processors, ASIC devices, and/or GPUs of the full node computing devices 210A-210F may execute consensus algorithms to identify a nonce corresponding to the particular executed consensus algorithm and related to the digest that combines the digest of the smart contract operation network function request 290 and the block hash of the most immediately preceding block of the blockchain 226.

The identification of the nonce enables the processors, ASIC devices, and/or GPUs of the full node computing device from the full node computing devices 210A-210F to create a new block with a block header (e.g., block hash), which is a digest that combines the smart contract operation network function request 290, the block hash of the most immediately preceding block, and the identified nonce. The processors, ASIC devices, and/or GPUs of the full node computing device from the full node computing devices 210A-210F may execute network protocols to add the new block to the blockchain 226 and broadcast the new block to the other full node computing devices in the decentralized P2P network 270. In some arrangements, the new block may also be time-stamped at a time corresponding to the addition to the blockchain 226. Furthermore, as a reward for adding the new block to the blockchain 226, the full node computing device from the full node computing devices 210A-210F may be allowed, per the network protocols, to increase a balance sheet holdings amount associated with itself by a predetermined amount. In some arrangements, each of the full node computing devices 210A-210F may receive an equal portion of the data transfer amount specified by the lightweight node computing device 250A for executing the smart contract operation network function request 290. After the new block has been added to the blockchain 226, the smart contract operation transaction network function request 290 may be considered to be executed and the data transfer from the wallet associated with the lightweight node computing device 250A to the public key associated with the smart contract may be registered.

When the smart contract receives the data value from each of the lightweight node computing device 250A and the lightweight node computing device 250B, the execution of the smart contract by each of the full node computing devices 210A-210F may cause transfer of the data value from the lightweight node computing device 250A to the lightweight node computing device 250B and the data value from the lightweight node computing device 250B to the lightweight node computing device 250A.

For example, the lightweight node computing device 250A may transmit the smart contract operation network function request 290 to the decentralized P2P network 270, which may cause execution of the corresponding smart contract that facilitates the dual data transfer. In the process of adding the block comprising the smart contract operation request provided by the lightweight node computing device 250A to the blockchain 226, each of the full node computing devices 210A-210F may identify the block within the blockchain 226 comprising the smart contract, associate the data transfer entailed by the smart contract operation request of the lightweight node computing device 250A with the smart contract, and execute the one or more algorithms and/or programs of the smart contract. In this instance, given that the smart contract facilitates a dual data transfer and that data transfers have been received from the lightweight node computing device 250A and the lightweight node computing device 250B, each of the full node computing devices 210A-210F may execute the smart contract as fulfillment of the programmatic conditions established by the smart contract has occurred. Accordingly, the funds allocated to the smart contract by each of the lightweight node computing device 250A and the lightweight node computing device 250B may be respectively distributed to the intended counterparty.

While the description provided above was made in relation to the lightweight node computing device 250A and the lightweight node computing device 250B, it should be understood that any of the full node computing devices and the lightweight node computing devices in the decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, data transfers, digital content storage and delivery, entity authentication and authorization, digital identity, marketplace creation and operation, internet of things (e.g., IoT), prediction platforms, currency exchange and remittance, P2P transfers, ride sharing, trading platforms, and real estate, precious metal, and work of art registration and transference.

In comparison to the centralized computing system 100 described in regard to FIG. 1, the decentralized P2P computer system 200 may provide technological advantages. For example, by distributing storage of the blockchain 226 across multiple full node computing devices 210A-210F, the decentralized P2P computer system 200 may not provide a single point of failure for malicious attack. In the event that any of the full node computing devices 210A-210F are compromised by a malicious attacker, the decentralized P2P computer system 200 may continue to operate unabated as data storage of the blockchain 226 and performance of network processes are not controlled by a singular entity such as the server infrastructure 110 of the centralized computing system 100.

Furthermore, by utilizing the blockchain data structure 226, the decentralized P2P system 200 may provide technological improvements to the conventional decentralized P2P systems in regard to byzantine fault tolerance stemming from an unreliable and/or malicious full node acting in the decentralized P2P network 270 to undermine the work efforts of the other nodes. For example, in coordinating action between the full node computing devices 210A-210F in relation to a similar computational task (e.g., consensus algorithm), a malicious node would need to have computational power greater than the combined computational power of each of the other full node computing devices in the decentralized P2P network 270 to identify the nonce and thereby be able to modify the blockchain 226. As such, the likelihood that a malicious node could subvert the decentralized P2P network 270 and enter falsified data into the blockchain 226 is inversely proportional to the total computational power of the decentralized P2P system 200. Therefore, the greater the total computational power of the decentralized P2P system 200, the less likely that a malicious node could subvert the decentralized P2P network 270 and undermine the blockchain 226.

Figure 3B:
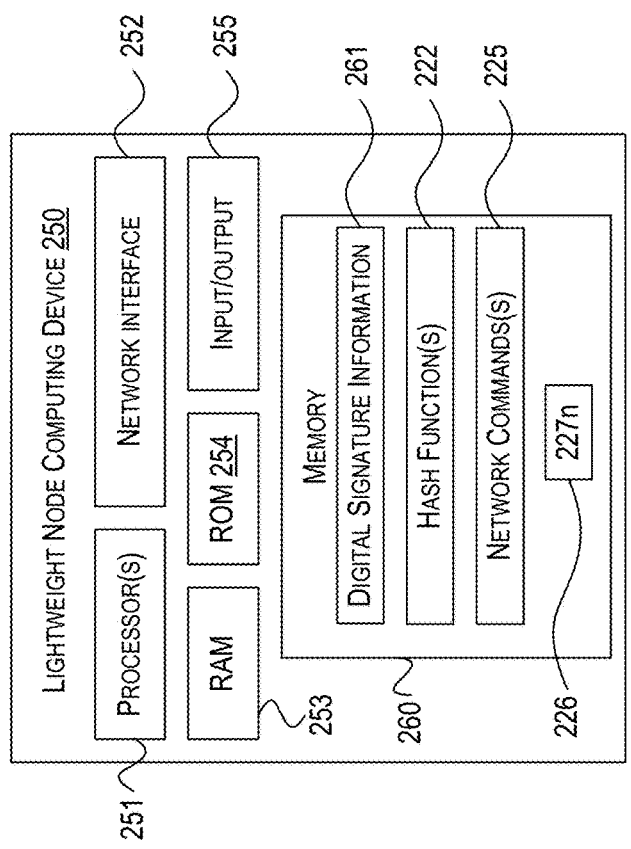
FIG. 3B depicts an illustrative example of a lightweight node computing device that may be used in accordance with one or more illustrative aspects described herein.
Figure 3A:
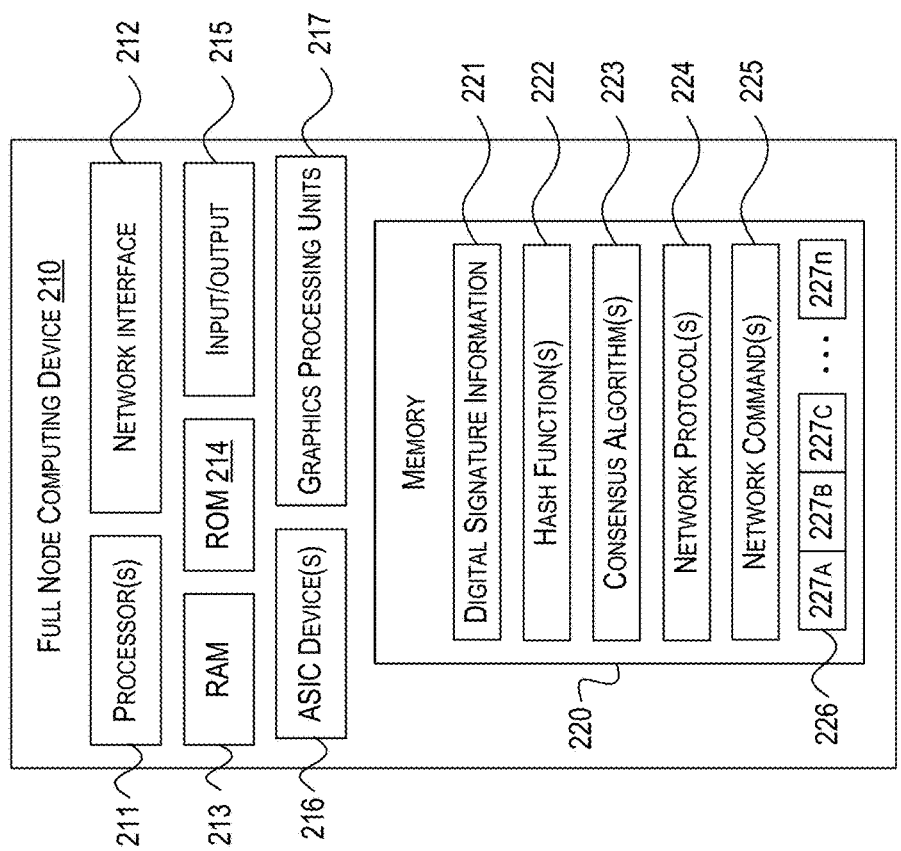
FIG. 3A depicts an illustrative example of a full node computing device that may be used in accordance with one or more illustrative aspects described herein.

FIG. 3A depicts an illustrative example of a full node computing device 210 that may be used in accordance with one or more illustrative aspects described herein. The full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, the full node computing device 210 may be configured to operate in a decentralized P2P network and may request execution of network functions and/or execute requested network functions and maintain inter-nodal agreement as to the state of a blockchain of the decentralized P2P network.

The full node computing device 210 may include one or more processors 211, which control overall operation, at least in part, of the full node computing device 210. The full node computing device 210 may further include a random access memory (RAM) 213, a read only memory (ROM) 214, a network interface 212, one or more input/output interfaces 215 (e.g., keyboard, mouse, display, printer, etc.), and a memory 220. The input/output (I/O) 215 may include a variety of interface units and drives for reading, writing, displaying, and/or printing data or files. In some arrangements, the full node computing device 210 may further comprise specialized hardware components such as application-specific integrated circuit (e.g., ASIC) devices 216 and/or graphics processing units (e.g., GPUs) 217. Such specialized hardware components may be used by the full node computing device 210 in performing one or more of the processes involved in the execution of requested network functions and maintenance of inter-nodal agreement as to the state of a blockchain. The full node computing device 210 may further store in the memory 220 operating system software for controlling overall operation of the full node computing device 210, control logic for instructing the full node computing device 210 to perform aspects described herein, and other application software providing secondary, support, and/or other functionality which may or might not be used in conjunction with aspects described herein.

The memory 220 may also store data and/or computer executable instructions used in performance of one or more aspects described herein. For example, the memory 220 may store digital signature information 221 and one or more hash functions 222, consensus algorithms 223, network protocols 224, and/or network commands 225. In some cases, the digital signature information 221, the hash functions 222, and/or the network commands 225 may comprise a wallet of the full node computing device 210. The memory 220 may further store the blockchain 226. Each of the digital signature information 221, the hash functions 222, the consensus algorithms 223, the network protocols 224, and the network commands 225 may be used and/or executed by the one or more processors 211, the ASIC devices 216, and/or the GPUs 217 of the full node computing device 210 to create and maintain the decentralized P2P network, request execution of the network functions, and/or execute the requested network functions and maintain inter-nodal agreement of the state of the blockchain 226.

For example, to create and maintain the decentralized P2P network, the processors 211, the ASIC devices 216, and/or the GPUs 217 of the full node computing device 210 may execute the network protocols 225. Execution of the network protocols 225 may cause the full node computing device 210 to form a communicative arrangement with other full node computing devices and thereby create the decentralized P2P network. Furthermore, the execution of the network protocols 225 may cause the full node computing device 210 to maintain the decentralized P2P network through the performance of computational tasks related to the execution of network requests related to the blockchain such as the blockchain 226. As will be described in detail below, the execution of such computational tasks (e.g., the hash functions 222, the consensus algorithms 223, and the like) may cause the full node computing device 210 to maintain inter-nodal agreement as to the state of the blockchain with other full node computing devices comprising the decentralized P2P network.

To request execution of the network functions, such as balance sheet transactions and/or smart contract operations, the processors 211, the ASIC devices 216, and/or the GPUs 217 of the full node computing device 210 may execute the network commands 225 to broadcast the network function to a decentralized P2P network comprising a plurality of full nodes and/or lightweight nodes. The request may be digitally signed by the full node computing device 210 with usage of the private/public key information and through execution of the digital signature algorithms of the digital signature information 221.

To execute the requested network functions and maintain inter-nodal agreement of the state of the blockchain, the processors 211, the ASIC devices 216, and/or the GPUs 217 of the full node computing device 210 may execute the network protocols 224 to receive a broadcast of a requested network function through a decentralized P2P network and from a requesting entity such as a full node or a lightweight node. The processors 211, the ASIC devices 216, and/or the GPUs 217 of the full node computing device 210 may execute the hash functions 222 to generate a digest of the requested network function. The resultant digest of the requested network function, in turn, may be hashed with the block hash of the most immediately preceding block of the blockchain. As will be described in further detail below, the processors 211, the ASIC devices 216, and/or the GPUs 217 of the full node computing device 210 may execute the consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables the processors 211, the ASIC devices 216, and/or the GPUs 217 of the full node computing device 210 to create a new block with a block header (e.g., block hash), which is a digest that combines the digest of the requested network function, the block hash of the most immediately preceding block, and the identified nonce. The processors 211, the ASIC devices 216, and/or the GPUs 217 of the full node computing device 210 may add the new block to the blockchain based on the network protocols 224 and broadcast the new block to the other nodes in the decentralized P2P network.

As stated above, in some cases, a plurality of network function requests may be broadcasted across the decentralized network P2P network. The processors 211, the ASIC devices 216, and/or the GPUs 217 of the full node computing device 210 may execute network protocols 224 to receive broadcast of each of the network functions through the decentralized P2P network and from the requesting entities. The processors 211, the ASIC devices 216, and/or the GPUs 217 of the full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. The processors 211, the ASIC devices 216, and/or the GPUs 217 of the full node computing device 210 may execute the consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables the processors 211, the ASIC devices 216, and/or the GPUs 217 of the full node computing device 210 to create a new block with a block header (e.g., block hash), which is a digest that combines the root digest of the requested network functions, the block hash of the most immediately preceding block, and the identified nonce. The processors 211, the ASIC devices 216, and/or the GPUs 217 of the full node computing device 210 may add the new block to the blockchain based on the network protocols 224 and broadcast the new block to the other nodes in the decentralized P2P network.

Furthermore, the memory 220 of the full node computing device 210 may store the blockchain 226. The blockchain 226 may include one or more blocks 227A, 227B, 227C, . . . 227n, wherein the block 227A represents the first block (e.g., genesis block) of the blockchain 226 and block 227n represents the most immediate block of the blockchain 226. As such, the blockchain 226, which may be a replica or copy of the blockchain of the decentralized P2P network in which the full node computing device 210 operates, may be a full or complete copy of the blockchain of the decentralized P2P network. Each of the blocks within the blockchain 226 may include information corresponding to the one or more network functions executed by the decentralized P2P network. As such, the blockchain 226 as stored in the memory 220 of the full node computing device 210 may comprise the totality of the network functions executed by the decentralized network.

FIG. 3B depicts an illustrative example of a lightweight node computing device 250 that may be used in accordance with one or more illustrative aspects described herein. The lightweight node computing device 250 may be any of a personal computer, a server computer, hand-held or a laptop device, a multiprocessor system, a microprocessor-based system, a set top box, a programmable consumer electronic device, a network personal computer, a minicomputer, mainframe computer, a distributed computing environment, a virtual computing device, and the like and may operate in a decentralized P2P network. In some embodiments, the lightweight node computing device 250 may operate in a decentralized P2P network and may be configured to request execution of network functions through the decentralized P2P network. As such, the lightweight node computing device 250 may be different than the full node computing device 210 in that it is not configured to execute the network functions and/or operate to maintain a blockchain of the decentralized P2P network. In other aspects, the lightweight node computing device 250 may have substantially the same physical configuration as the full node computing device 210, but may be configured with different programs, software, etc.

The lightweight node computing device 250 may include one or more processors 251, which control overall operation of the lightweight node computing device 250. The lightweight node computing device 250 may further include a random access memory (RAM) 253, a read only memory (ROM) 254, a network interface 252, one or more input/output interfaces 255 (e.g., keyboard, mouse, display, printer, etc.), and a memory 260. The input/output (I/O) 255 may include a variety of interface units and drives for reading, writing, displaying, and/or printing data or files. The lightweight node computing device 250 may store in the memory 260 operating system software for controlling overall operation of the lightweight node computing device 250, control logic for instructing the lightweight node computing device 250 to perform aspects described herein, and other application software providing support and/or other functionality which may or might not be used in conjunction with aspects described herein.

In comparison to the full node computing device 210, the lightweight node computing device 250 might not include, in some instances, specialized hardware such as the ASIC devices 216 and/or the GPUs 217. Such may be the case because the lightweight node computing device 250 might not be configured to execute network functions and/or operate to maintain a blockchain of the decentralized P2P network as is the full node computing device 210. However, in certain arrangements, the lightweight node computing device 250 may include such specialized hardware.

The memory 260 of the lightweight node computing device 250 may also store data and/or computer executable instructions used in performance of one or more aspects described herein. For example, the memory 260 may store digital signature information 261 and one or more hash functions 222 and network commands 225. In some arrangements, the digital signature information 261, the hash functions 222, and/or the network commands 225 may comprise a wallet of the lightweight node computing device 250. Each of the hash functions 222 and the network commands 225 stored in the memory 260 of the lightweight node computing device 250 may be respectively similar and/or identical to the hash functions 222 and the network commands 225 stored in the memory 220 of the full node computing device 210.

In regard to the digital signature information, each of the digital signature information 261 stored in the memory 260 of the lightweight node computing device 250 and the digital signature information 221 stored in the memory 220 of the full node computing device 210 may comprise similar and/or identical digital signature algorithms. However, the private/public key information of the digital signature information 261 stored in the memory 260 of the lightweight node computing device 250 may be different than that of the private/public key information of the digital signature information 221 stored in the memory 220 of the full node computing device 210. Furthermore, the private/public key information of each node, whether full or lightweight, in the decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in the decentralized P2P computing network.

Each of the digital signature information 261, the hash functions 222, and the network commands 225 may be used and/or executed by one or more processors 251 of the lightweight node computing device 250 to request execution of the network functions in a decentralized P2P network. For example, to request execution of the network functions, such as the balance sheet transactions and/or the smart contract operations, the processors 251 of the lightweight node computing device 250 may execute the network commands 225 to broadcast the network function to a decentralized P2P network comprising a plurality of full nodes and/or lightweight nodes. The request may be digitally signed by the lightweight node computing device 250 with usage of the private/public key information and through execution of the digital signature algorithms of the digital signature information 261.

Furthermore, the memory 260 of the lightweight node computing device 250 may store the blockchain 226. The blockchain 226 stored in the memory 260 of the lightweight node computing device 250 may include at least the block 227n, wherein the block 227n represents the most immediate block of the blockchain 226. As such, the blockchain 226, which may be a replica or copy of the blockchain of the decentralized P2P network in which the lightweight node computing device 250 operates, may be a partial or incomplete copy of the blockchain of the decentralized P2P network. In some instances, however, the blockchain 226 may include one or more of the blocks 227A, 227B, 227C . . . 227n, wherein the block 227A represents the first block (e.g., genesis block) of the blockchain 226 and the block 227n represents the most immediate block of the blockchain 226. As such, the blockchain 226 may be a full or complete copy of the blockchain of the decentralized P2P network. Each of the blocks within the blockchain 226 may include information corresponding to the one or more network functions executed by the decentralized P2P network.

Data Manifest as a Service (DMAAS)

In some cases, electronic data management EDM standards may mandate reconciliation of data movement between any two points, such as between a data provider computing system and a data consumer computing system. These EDM standards may require counts, hash totals, and/or a unique identifier per transaction (e.g., a data exchange transaction). In some cases, a new standard may require metadata, such as metadata for field names, logical field names, descriptions, and the like to be included in the manifest. Such data manifests may need to be maintained for a defined period of time (e.g., 6 years). Such requirements may be required for different types of data exchange transactions, such as a file push transaction or a file pull transaction. Additionally, a data consumer computing system must match the counts and hash totals included in the data exchanged or pursue an exception process to notify both the data consumer computing system and the data provider computing system that an exception has occurred for that particular transaction.

As more regulations and standards are introduced into managing data transactions, existing computing systems and/or applications must be updated to comply with current standards. Such upgrades may be costly and may be inconsistent and costly if implemented independently across different computing systems that share information. The regulating agencies may set a time deadline at which a new enhanced data manifest standard must be implemented by within an enterprise computing system organization to ensure proper data security is maintained for each electronic data transaction. As mentioned, due to many business organizations or enterprises having large numbers of computing systems exchanging information across multiple geographical locations, independent implementations will be both costly and inconsistent and may not operate as expected.

Additionally, many enterprises do not have a way to view or review data contracts and/or data manifests defining parameters of particular electronic data exchange transactions. Additionally, in current implementations, data manifests may not be secure and may be compromised as they may be sent with the data payload during the transaction. As such a need has been recognized for a computing system and infrastructure to implement and manage data exchange transactions and data manifests for both data provider computing systems and data consumer computing systems that is both cost effective to implement and manage and provides a high level of data security.

Figure 4:
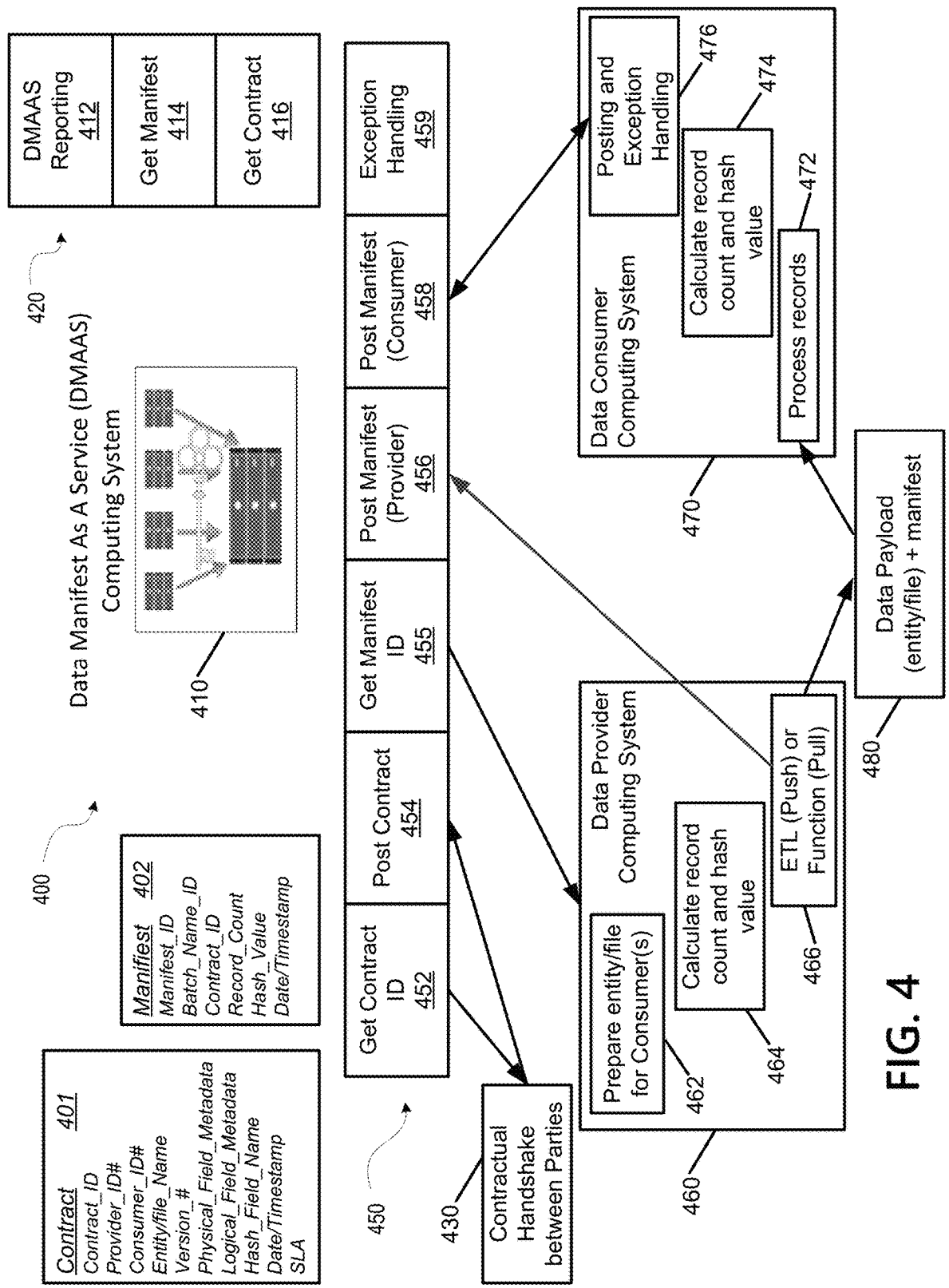
FIG. 4 shows an illustrative block diagram of a data manifest as a service computing system and method of operation according to aspects of this disclosure.

FIG. 4 shows an illustrative block diagram of a data manifest as a service (DMAAS) computing system 400 and method of operation according to aspects of this disclosure. The DMAAS computing system 400 may include one or more decentralized computing devices (e.g., a centralized DMAAS management computing system 410), such as the full node computing devices 210A, 210B, 210C, 210D, 210E, and 210F and the lightweight node computing devices 250A and 250B discussed with respect to the decentralized P2P computer system 200 shown in FIG. 2. Additionally, the DMAAS computing system 400 may include one or more additional computing systems, such as the data provider computing system 460 and the data consumer computing system 470. Business organizations, educational institutions, government entities, and other such entities may provide services to consumers via computing resources such as via one or more applications running on the computing resources. In many cases, the computing resources may be used to provide products and/or services to different users, such as via one or more computing networks, such as the Internet, a wide area network (WAN), a telecommunications network, a local area network (LAN), a cable network, and/or the like. In some cases, these computing systems may include distributed computing centers, such as data centers, cloud computing systems, application servers including large numbers of computing resources, such as servers, data repositories, web servers, and the like that may be used to provide the products and/or services to the consumer.

In an illustrative example, a business organization may offer one or more products and/or services such as cable, phone, and Internet services to one or more computing platforms associated with the consumer, such as a personal computer, a smart phone, a laptop computer, a tablet, and/or the like. Additional examples of the products and/or services may include financial services (e.g., an online banking service, an online trading service, and the like), educational services (e.g., an online educational course, a testing service, and the like), online shopping (e.g., an online marketplace, and the like), and/or may also provide a host of other services to their customers, such as email, personalized homepages, web page hosting, and other content and/or value-added resources. In many cases, consumers of a product or service may be internal to the business organization. For example, an organization may have a centralized information technology department that may be tasked with supporting multiple business units geographically or otherwise physically remote from the information technology department. In many cases, the different applications across the entity's computing systems may share information. Because such information may include sensitive or private information, a number of organizations may set, enforce and/or audit information technology or other regulatory standards to ensure proper controls are maintained over data as it is transferred between applications. Enterprise Data Management (EDM) standards mandate processes and controls to reconcile data movements between applications and define standards to ensure accurate and consistent data while maintaining transparency over data movement between different applications and use. Additionally, EDM standards allow organizations to ensure data precision and granularity is maintained when content is transferred between applications and processes. Because many applications are developed independently and at different times, EDM standards allow organizations to maintain data integrity, monitor data use, and provide reports of both. However, such implementations are dependent upon the information made available and/or stored as defined at the time the applications were developed. Such uncoordinated implementations may result in data conflicts, data quality inconsistency and a lack of an audit trail for information as it passes from one application to another. As such, trustworthiness of the data may be reduced as it is used by a receiving application and reporting details may be limited.

Data, including private or otherwise non-public data, may be shared between applications of one or more organizations. Over time, an enterprise may develop tens to hundreds of different applications by different groups or departments. These applications may exchange data on a regular schedule, as a one-time event, or in response to an event. Because of the nature of this data, a number of regulatory or industry organizations may create, enforce and audit regulations regarding any movement of data. Additionally, this data exchange may be monitored to enforce data integrity regulations and store data about the data exchange for audit purposes. Entities may generate policies to enact these regulations and/or to enhance data integrity of data communicated through its networks by capturing data movement between applications. The applications may be developed over time by different development groups. As such, the way in which an application was developed and/or by which group or developer created the applications, each application may implement data monitoring policies differently. Upgrading each application individually to meet the latest standards is an expensive and process intensive activity, with no guarantee that each application will be updated and/or operate correctly. As such, a need has been recognized for a method and computing system to capture data movement between applications in a way that is centralized over a whole enterprise and that can be easily, and economically, implemented by different applications.

Data transfer between applications can be viewed as a contract between two parties of an electronic data exchange transaction. For example, a data exchange contract may specify an amount of data to be transferred between a data provider computing system and a data consuming computing system, a schedule for the transfer such as a time, date and/or frequency of the transfer, metadata associated with the transfer, and the like. Because of the nature of these electronic transactions, a blockchain may be used to store an immutable record of all data exchange transaction between computing applications, where every movement of data between applications may be stored as a block in a blockchain. As such, the blockchain may store a data record about millions of data exchange transactions, which would be impossible under previously used methods. In some cases, a centralized computing system may manage a public (or private) blockchain implementation implemented as multiple nodes. In an illustrative case, management of the multiple nodes of a blockchain computing system may be centralized with respect to all data producer computing systems and data consumer computing systems across an enterprise, or other computing network. For example, error handling and/or data reporting may be handled centrally to be standardized across the enterprise network. In some cases, multiple nodes of the blockchain system may be implemented within a computing network on a private network, on a public network, or as a combination of public and private nodes. In some cases, the nodes may be configured in a cloud computing configuration, a network configuration, or as a combination of cloud computing nodes and network nodes.

As discussed above, enterprise data management standards may mandate that enterprises reconcile data movements between applications. Such information is often mandated to be stored for a defined period of time, such as for 6 years. For example, the EDM standards may require that counts of records be matched on either end of a data exchange transaction, to ensure no loss of data during the transfer. In some cases, matching may be done using a count and/or hash total with reference to a unique data identifier. In some cases, the EDM standards may require a data manifest storing information about the data exchange, such as a name of each field of the data transferred. When an entity is audited, the auditing agency often looks at data quality and the ability of the enterprise to reconcile and/or audit the data. By using blockchain technology, more information about each contractual data transaction may be stored and may be available for inspection than in other pre-existing implementation, regardless of whether data is pushed or pulled from the data provider computing system. Additionally, when an enterprise computing network is audited, the auditing agency may randomly pick an application, from thousands, to be audited. Currently, the enterprise often cannot guarantee that each application is properly following the present procedures and/or stores the necessary transaction information. However, by using blockchain, each data transaction is associated with a block and can be recalled as desired, along with the associated data manifest.

In an illustrative data exchange example, an illustrative data exchange contract may be made between a first computing system and a second computing system to communicate a number of records between the first computing system to the second computing system on a specified day of a month at a particular time. For example, all salary records (e.g., 10,000 records) may be communicated from the first computing system (e.g., a data provider computing system) to the second computing system (e.g., the data consumer computing system) on the first of the month between 9 AM and 10 AM, and is expected to take approximately 30 minutes. In preparation of the data transfer, at least one of a plurality of data fields (e.g., a salary amount field) of each data record may be selected for use in a hash calculation across all data records being sent. This calculated hash total may be inserted into the data being sent and may be communicated to the data consumer computing system with the communicated data. The data consumer computing system may then perform a hash calculation of the same data field and compare the totals to ensure proper communication. For example, if the hash totals match, no errors were encountered. Additional handshaking may also take place so that each computing system receives notification of the error handling process so that each computing system would be alerted of an error. In most applications, a general best practice for data movement may be implemented. However, because its implementation in each application is localized, the developers of each application are tasked to follow best practices with little or no oversight. Additionally, metadata may not be tracked for all data being communicated between applications. For example, some applications may communicate a name of a field upon which a hash total may be calculated, however all field names will not likely be included.

In some cases, an enterprise may have large numbers (e.g., hundreds, thousands, tens of thousands, and the like) of applications running on different computing systems at different geographical locations across its network. However, as discussed above, many applications may not comply with the latest EDM standard. As such, costs to implement each application to the latest specifications will be high, while the implementation will be inconsistent because the upgrades will be done at different times, according to different specifications, if done at all. In addition, data manifests may be compromised based on this inconsistent implementation, even if all applications are upgraded to provide them. As such, a need has been recognized for an efficient computing system for providing data manifests for all data exchange transactions across an enterprise, an easily implementation for disparate applications at multiple locations across the enterprise network, and a centrally accessible data repository capable of providing reporting and error handling across the entire enterprise data set. For example, an illustrative enterprise data reporting computing system, in conjunction with a data manifest as a service blockchain application programming interface (API) may provide reports across the data set including data provider computing system information, data consumer computing system information, application names, a data lineage path, error reporting information, and the like. The API functionality may also allow central reporting of data movement in real time, including pass through implementation not available in present implementations. An illustrative API may include functions that may be implemented by a data producer computing system, a data consumer computing system, and/or a data exchange monitoring (e.g., blockchain) computing system. In some cases, the API may provide functions to create a data manifest, set metadata for every transaction, calculate a hash total, provide error handling functionality, communicating that a data exchange transaction has been initiated, acknowledging receipt of data upon completion of the data exchange transaction, reporting and/or reconciling data regarding one or more data exchange transactions, and the like.

As part of a data exchange contract, two applications may "agree" to share electronic data via one or more electronic data exchange transactions. To manage the exchanged data, metadata about the agreement must be specified, such as a frequency of exchange (e.g., daily), a time of day for the data exchange transaction (e.g., between 6 AM and 8 AM), an expected duration of the data exchange transaction (e.g., about 30 minutes), field names for the exchanged data (e.g., record identifier, name, personal identification number, and the like) among others. In some cases, this metadata, or a portion of the metadata, may be included in the data manifest, an instance of which may accompany the data each time as it is transmitted between applications. In an illustrative data exchange agreement between computing applications may include a single contract outlining the particulars of the data to be exchanged and the timing of the data exchange, along with several data manifests that are associated with each particular data exchange transactions occurring under the contract. Each data manifest may include a unique hash total and data count corresponding to the associated data exchange transaction.

In past electronic data managing implementations, auditing and/or reporting on data movement might be difficult if not impossible, as a complete record of each data transaction may not be available. For example, while a data field may be specified for use in selecting a hash field, other data fields may not be specified. Additionally, once the data transfer has occurred, an original source for the data may not be stored. As such, a need has been recognized for an electronic data management system that can provide an audit trail, data lineage information and/or live data reporting on data movement. By use of blockchain technology, an audit trail may be provided in which data communications between applications may be tracked through an immutable data record (e.g., the blockchain) in which each block includes information about a particular data exchange transaction. For example, each block may include a record of a data contract, a data manifest, source application information, destination application information and the like. A reporting application or application incorporating functionality provided by a reporting API may allow for reporting views of the audit trail including each data exchange transaction.

Returning to FIG. 4, the DMAAS computing system 400 may include one or more data repositories that may store a data contract (e.g., the data contract 401) associated with each data exchange agreement between applications and/or a data manifest associated with data exchange transactions, such as the data manifest 402. The data contract 401 may include information about a data exchange agreement between two application including a contract identifier, an identifier of a data provider computing system or application, an identifier of a data consumer computing system or application, an entity or file name, field metadata (e.g., logical field metadata, physical field metadata, and the like), an identification of the field for use in hashing calculations (e.g., a hash field name), a date and/or time when the data exchange contract was created, an optional version of the data exchange contract, and the like. Each data contract may have one or more different data manifests associated with it, such as the illustrative data manifest 402. The data manifest may include metadata information associated with a particular data exchange transactions including, for example, a manifest identifier, an data exchange transaction batch identifier, a contract identifier corresponding to the associated data exchange contract, a count of the number of records exchanged in the associated data exchange transaction, a hash value, and a date and/or timestamp.

In some cases, various systems of the DMASS computing system 400 including, the centralized DMAAS management computing system 410, the data provider computing system 460 and the data consumer computing system 470 may implement various functions 412, 414, and 416 of an API 420 to implement central management of data exchange transaction over an enterprise network such as by posting information corresponding to each data exchange transaction to a blockchain. Such functions may include functionality to prepare electronic transactions to be posted to a blockchain and/or to retrieve electronic transaction information from the blockchain. Illustrative functions may include functions to get contract identifiers, to get contract information and/or to get contract details based on an identifier of a data producer computing system, an identifier of a data consumer computing system, a contract version, a contract name, and/or a contract identifier. In some cases, a function may be used to post a new contract to the blockchain. Functions may also include functionality to post and/or retrieve information corresponding to a data manifest for each electronic transaction based on a contract identifier, a contract version, a contract name, and/or the like. Such illustrative functions may include a function to get manifest information, get a manifest identifier, and/or other details regarding a manifest. Additional functions may be used to post a data manifest to the blockchain based on the manifest identifier and/or other such information. Functionality may be available in the API such that a function may be used by the data provider computing system to post, via a network, a new data provisioning transaction to the blockchain based on information such as a contract identifier, a manifest identifier, a data count, and/or a hash total. Additional functionality may be available in the API such that a function may be used by the data consumer computing system to post, via a network, a new data consuming transaction to the blockchain based on information such as a contract identifier, a manifest identifier, a data count, and/or a hash total. The API may include other functions to validate one or more transactions and/or to facilitate error handling and the like.

An illustrative method 450 of electronically tracking and managing a centrally managed record of data exchange transactions for a plurality of computing systems and/or applications communicatively coupled via one or more computing networks. In the illustrative method 450, a central record (e.g., a blockchain) may be associated with an application, a data provider (e.g., a data provider computing system, an application and the like), a data consumer application (e.g., a data consumer computing system, an application and the like), a data exchange contract, or the like. In some cases, a data contract may be initiated and/or retrieved via an electronic handshaking procedure 430 between a data consumer application and a data provider application in which parameters associated with subsequent data exchange transactions may be created or retrieved. At 452, the centralized DMAAS management computing system 410 may retrieve (or create) a contract identifier (ID) via an API function to initiate the electronic handshaking procedure 430 between the parties to define and/or retrieve data exchange parameters. At 454, the centralized DMAAS management computing system 410 may post a block (e.g., a first block of a block chain, a first block of a blockchain stream, or the like) to a data exchange blockchain. In some cases, each data contract may be associated with a unique blockchain, a data provider and/or data consumer or the combination, may be associated with a particular blockchain. In some instances, the API may cause a stream to be spawned from a particular blockchain based on the contract ID. For example, the data provider computing system or application may have a blockchain defined to track electronic data communicated to and/or from the system via the network. In some cases, all data may be tracked in a same blockchain. Sometimes, the data provider computing system 460 may exchange electronic data with multiple data consumer computing systems, such as the data consumer computing system 470. In such cases, the blockchain may include multiple streams, such that a particular blockchain stream may be configured to track electronic communicates associated with a particular data contract, with a particular data consumer computing system or the like. At 456, the data provider computing system 460 may get a data manifest identifier via an API function based on the identified contract ID and the data exchange parameters of the contract data structure 401. Based on those parameters, the data provider computing system may prepare data (e.g., a data structure, a data stream, or the like) to be sent to the data consumer computing system at 462. At 464, the data provider may calculate a record count of the plurality of records to be exchanged with the data consumer computing system 470 before, at 466, pushing via an API function to the data consumer computing system 470 or having the data pulled from the data consumer computing system 470 via an API function. When the data is pushed or pulled from the data provider computing system, the data exchange manifest (e.g., the data manifest data record 402) may be posted to the blockchain at 456 as the data payload itself, along with the data exchange manifest, is communicated via one or more communication networks. At 472, the data consumer computing system may process the received data records and data exchange manifest, including to calculate a data count and a hash value at 474, after which, the data exchange computing system 470 may post 476 the data exchange manifest, which may include the newly calculated hash value and/or data record count. At 459, the centralized DMAAS management computing system 410 may perform exception handling functions, as provided by the API, to check whether the data consumer computing system or the centralized DMAAS management computing system 410 has identified an error, such as an incorrect data record count or an incorrect hash value that fail to match the corresponding parameters calculated by the data provider computing system 460. Other errors may include a missed data exchange occurrence as defined by the data exchange contract, a data exchange duration error, a communication error received from the network upon which the data payload may be communicated, and/or the like. At 459, the API may provide the centralized DMAAS management computing system 410 with common error handling procedures, including logging results (e.g., a no error block, an error block) to the blockchain, where the error handling block may provide a record of a successful data exchange or may include an error status, along with one or more remedial actions that may be taken to resolve any identified data exchange errors.

Figure 5:
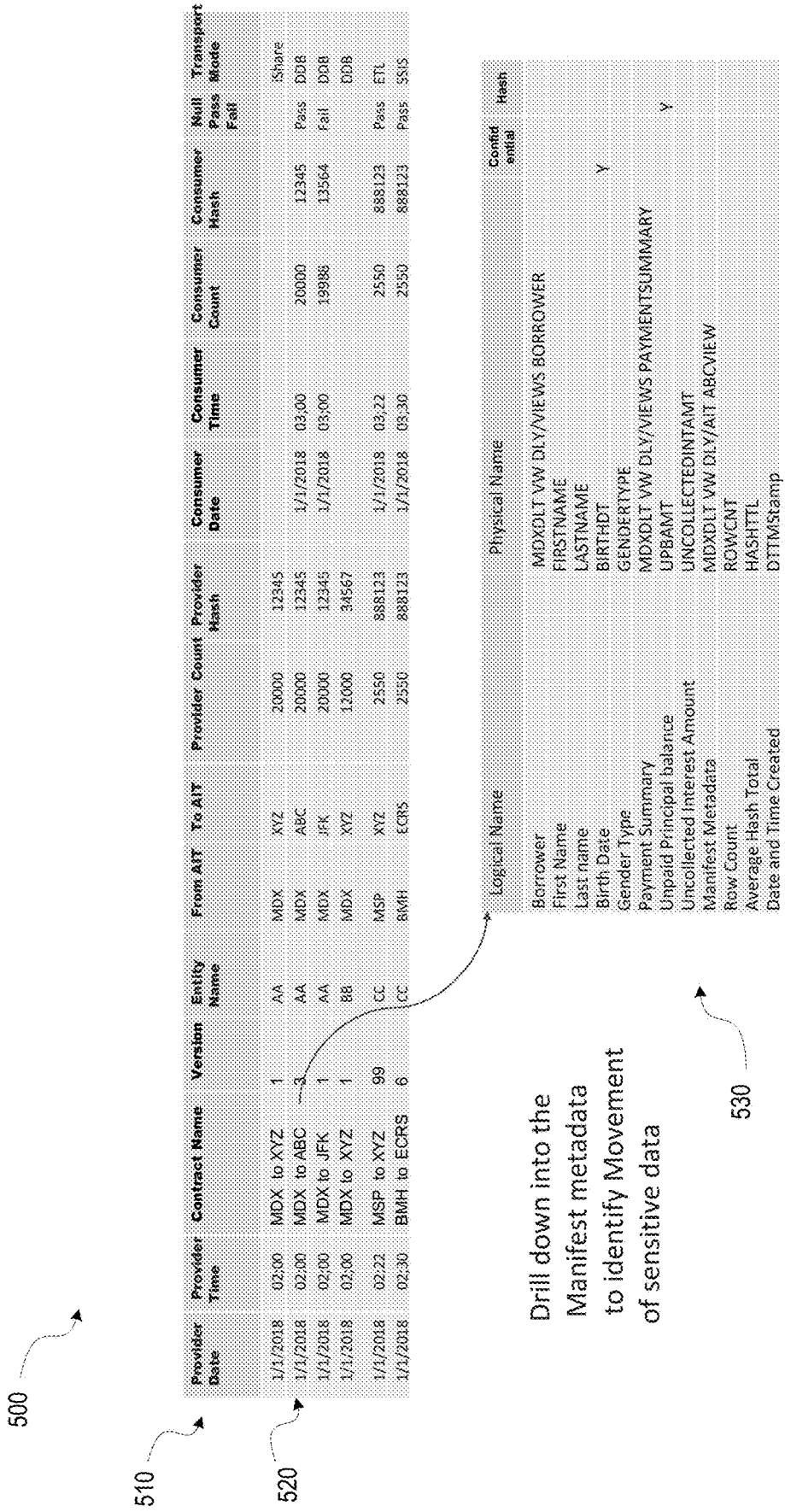
FIG. 5 shows representative user interface screens caused to appear on a user interface device by a data manifest as a service computing system according to aspects of the disclosure

Based on the immutable data record of the data exchange transactions associated with at least the data provider computing system 460 and the data consumer computing system 470, the API may provide the centralized DMAAS management computing system 410 with powerful reporting capabilities not available in current implementations due to, at least in part, incomplete data records being stored. FIG. 5 shows representative user interface screen information that may be caused to appear on a user interface device by the centralized DMAAS management computing system 410 according to aspects of the disclosure. In a first table 510, each row may be representative of a particular electronic data exchange transaction stored as one or more blocks in the blockchain. The table may contain information stored in the blockchain, such as a date and time the data exchange transaction was initiated by the data provider computing system 460, a contract name (e.g., data provider application name to data consumer application name), a contract version (optional) an entity name (e.g., an organization name), the data provider computer system or application name, the data consumer computer system or application name, a count associated with the data produced by the data provider computing system, a hash calculated by the data provider computing system, a time and date the data transaction completed (and/or started) at the data consumer computing system 470, a count of data received at the data consumer computing system or application, a hash calculated by the data consumer computing system, an indication if the data exchange transaction completed successfully, and an indication of the data exchange transport medium or network used for the data exchange transaction. In some cases, an input received at the user interface device may cause the centralized DMAAS management computing system 410 to generate a second user interface screen showing a "drill-down" visualization for a particular data exchange transaction via an additional user interface screen communicated to the user interface device. For instance, the drill down visualization may allow a visualization of the information sent via the transport mechanism such as by identifying a particular data manifest and pulling information associated with the manifest. In the illustrative example of an borrow information data exchange transaction 520 shown in FIG. 5, the second user interface screen 530 may be associated with additional metadata associated with the data manifest of the data exchange transaction, field names (e.g., borrower, first name, last name, birth date, gender, payment summary, unpaid principle balance, uncollected interest amount, and the like), data manifest metadata, a count parameter, a hash parameter, a date and/or time stamp, and the like. In some cases, additional indicator information may be provided in the metadata, such as an indicator identifying whether particular data is confidential and/or for identifying which field is used for calculating the hash total.

By doing this, the information stored in the blockchain may allow a user to view at least a portion of data associated with the data exchange transaction, patterns may be identified, such as for troubleshooting or data tracking purposes, to identify a data stream in which the data exchange transaction occurs, whether a time of day at which the data exchange transaction occurs would have an effect on whether the data exchange transaction finishes within the specified time window, whether a particular data transport mechanism is capable of communicating the data exchange transaction reliably, and the like. Such information may allow the centralized DMAAS management computing system 410 to analyze the information corresponding to one or more data exchange transaction associated with a contract, between two particular computing system, a particular data transport mechanism to identify patterns and/or problems that may occur and may automatically implement a solution such as by adjusting a time of day at which the contracted data exchange transaction is to occur, to lengthen an allowable duration in which the data exchange transaction is to complete, modify which transport mechanism is used, or the like. Additionally, unlike currently implemented methods, the immutable characteristics of the data exchange transaction records stored in a centrally located blockchain allows the centralized DMAAS management computing system 410 to track data movement throughout the enterprise and through applications such that unauthorized data redistribution may be identified and/or stopped.

Figure 6:
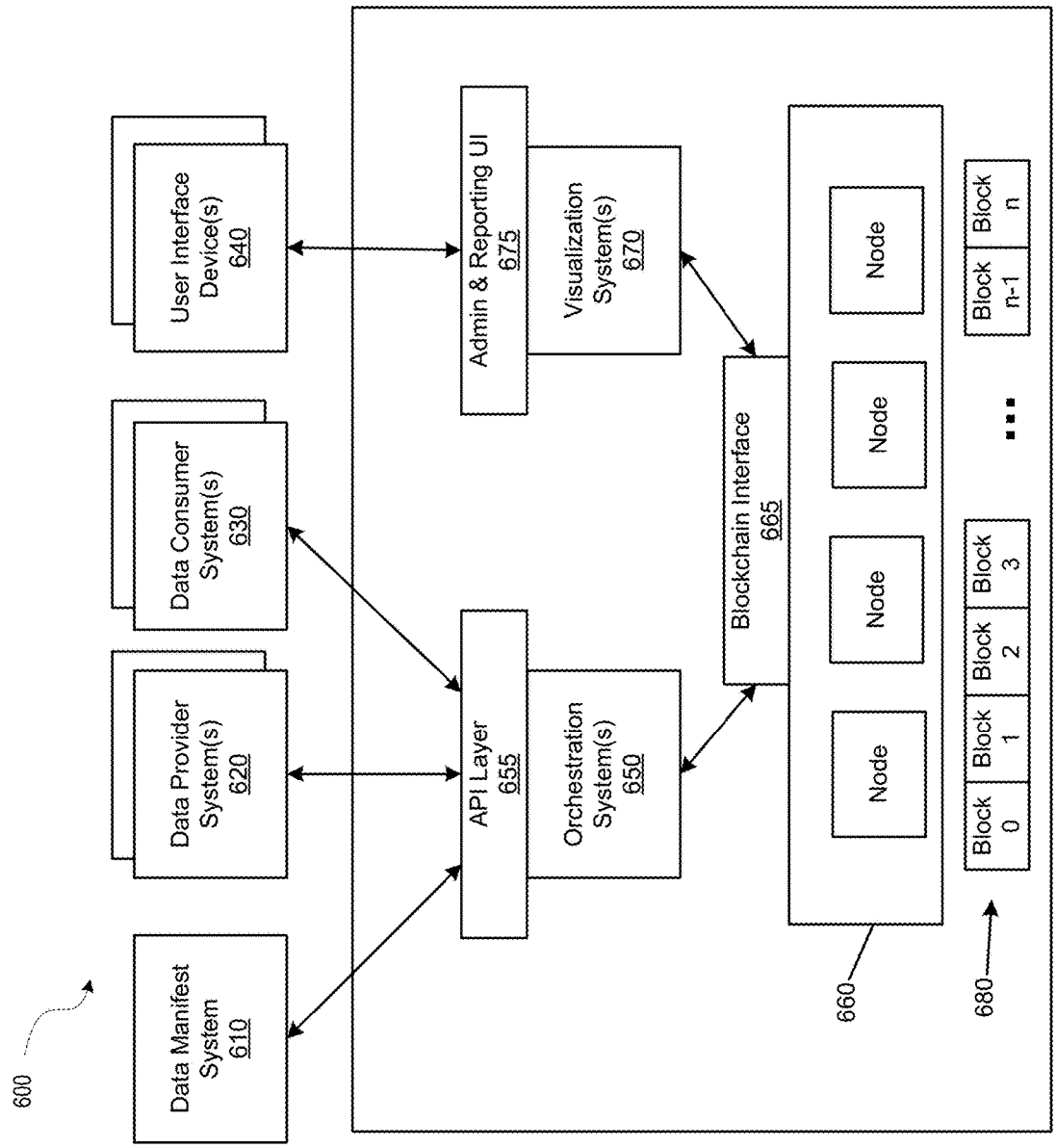
FIG. 6 shows an illustrative centralized data manifest as a service computing system according to aspects of the disclosure.

FIG. 6 shows an illustrative centralized data manifest as a service management computing system 600 according to aspects of the disclosure. As shown in the illustrative example, the DMAAS computing system 600 may include a data manifest computing system 610, one or more data provider computing systems 620, and one or more data consumer computing systems 630, communicatively coupled via a network, such as an enterprise computing network, the Internet, or the like, to an orchestration computing system 650 via an API layer 655. The DMAAS computing system 600 may also include one or more user interface devices 640 communicatively coupled via the network to a visualization computing system 670 via an administration and/or reporting user interface. The orchestration system 650 and the visualization system 670 may communicate to one or more nodes of a decentralized P2P system 650 via a blockchain interface 655, where the blockchain interface 665 may facilitate creation of a blockchain 680 via use of one or more API functions implemented in the data manifest system 610, the data provider computing systems 620, the data consumer computing systems 630 and/or the orchestration system 650.

Figure 7:
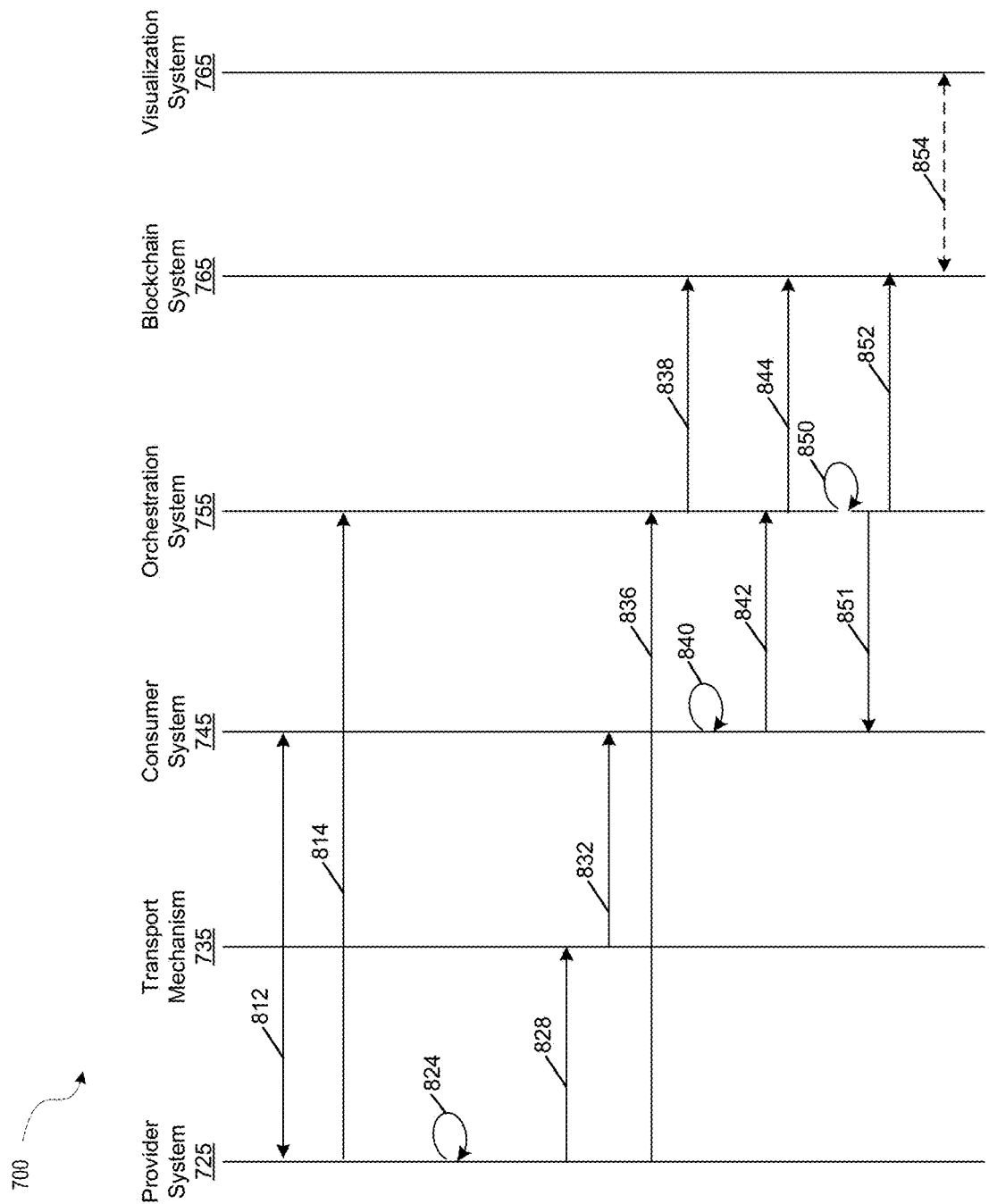
FIGS. 7 and 8 show an illustrative method for tracking data exchange transactions using blockchain according to aspects of the disclosure.
Figure 8:
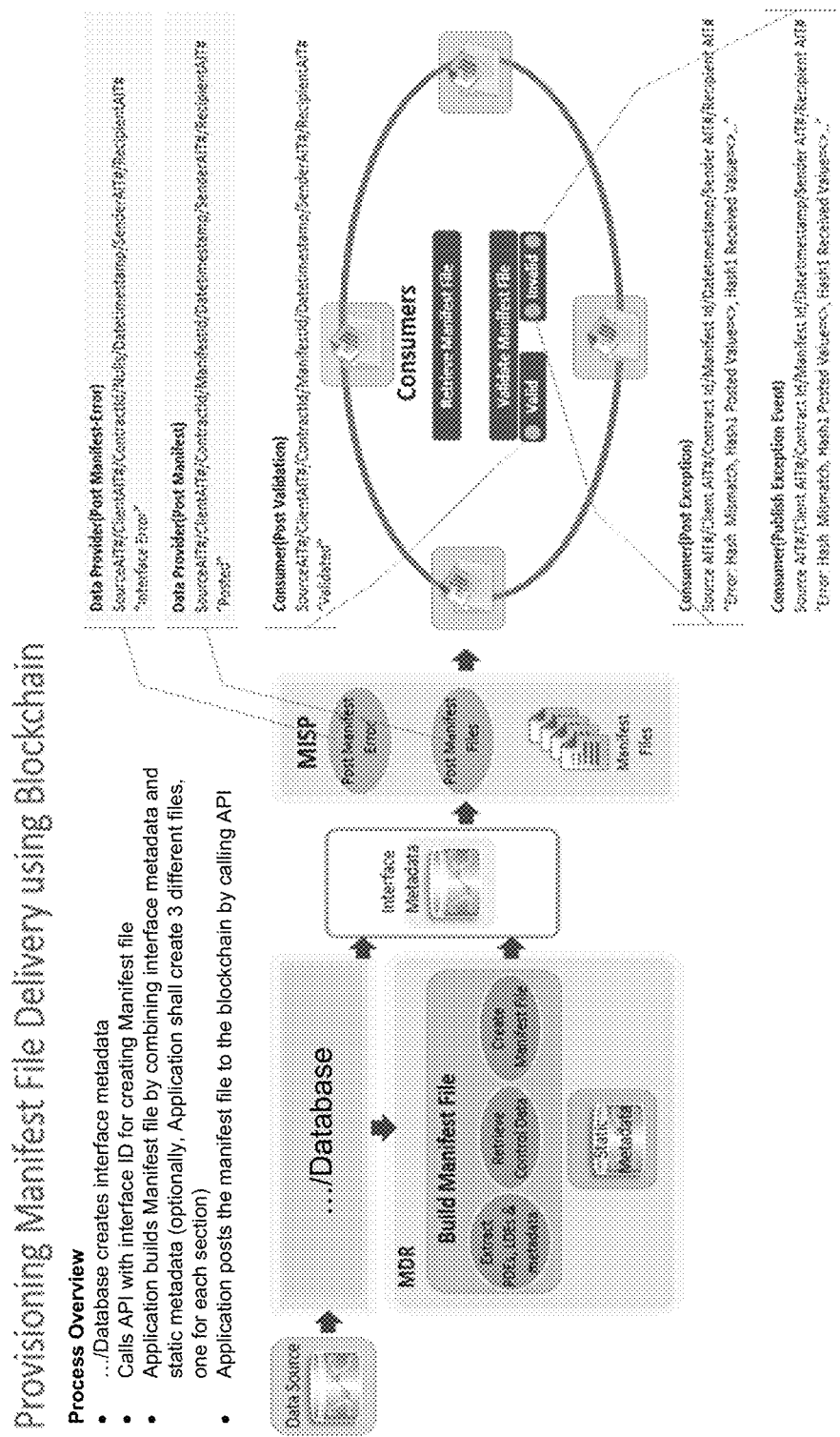

FIGS. 7 and 8 show an illustrative method for tracking data exchange transactions via blockchain according to aspects of the disclosure. To begin data exchange between a data provider computing system 725 and a data consumer computing system 745, such as between different applications running on an enterprise network, a data exchange contract must be created at 812. Here, parameters concerning data to be shared between the applications will be defined by both the data provider computing system 725 and the data consumer computing system 745 including fields to be exchanged, a frequency of the data exchange (e.g., daily, weekly, monthly, and the like), a time of day for the exchange, the transport mechanism for the data transfer, and the like. The once completed the provider computer system communicates the data contract to the orchestration computing system 814, such as by using an API function, and in response to the function input, the orchestration computing system 755 triggers, at 814, entry of the data exchange contract in a block in the blockchain (e.g., the blockchain 680) by the blockchain computing system 765. In some cases, the data contract may be stored as the first block in a blockchain or blockchain stream. In some cases, different versions of the data exchange contract may be stored in the blockchain, where newer versions of the contract may be stored as part of a same stream of a blockchain or as an initial block in a blockchain stream.

Continuous data exchange interactions between the data provider computing system 725 and the data consumer computing system 745 may be based on a data transaction agreement defined in the contract. Each data exchange transaction may include triggering one or more records to be added to the blockchain. In the illustrative example, the data provider computing system 725 may assemble a data payload for transfer to the data consumer computing system 745 and an associated data manifest, at 824. At 828 and 832, the data provider computing system 725 may communicate the data payload to the data consumer computing system 745 via the transport mechanism 735. Additionally, the data provider computing system 725 may communicate the data manifest to the orchestration computing system 755 at 836, such as via an API function. An illustrative API function to post the data manifest to the blockchain may cause the orchestration to trigger entry of the data manifest as a block in the associated blockchain at 838. At 840, the data consumer computing system 745 receives the data payload and may execute preliminary exception processing including calculating a hash value, determining a count of data records received, determine a duration of the data exchange transaction, and/or the like. At 842, the data consumer computing system 745 may, at 842, send a second data manifest generated by the data consumer computing system 745 to the orchestration computing system 755 via an API function to trigger the second data manifest to be posted to the blockchain by the blockchain computing system 765 at 844. The data consumer computing system may provide the data payload to the application, in some cases pending a positive response to additional exception handling processes. At 850, the orchestration system 755 may process the first data manifest received from the data provider computing system 725 and the second data manifest provided by the data consumer computing system 745, such as by using one or more API functions, and may communicate, at 851, a pass or fail indication to the data consumer computing system 745. In some cases, the data consumer computing system 745 may wait until receipt of a pass indication to provide the data payload to the application using the transferred data. If the orchestration computing system 745 determines that an error has occurred (e.g., the API function returns an error), such as a hash error, or count mismatch error or the like, the orchestration computing system 745 may trigger the blockchain system 765 to post the data exchange transaction error to the blockchain via an API function call at 852. At 854, the visualization system 765 may process a plurality of API function calls to mine the blockchain data to report data exchange status information and the like via one or more user interface screens.

In some cases, the orchestration computing system 755 and/or the visualization system 765 may analyze data exchange status information stored in one or more blockchains or blockchain streams to provide a variety of reports to users, to adjust terms of a data exchange contract to allow for more efficient data transfers, to change a data transport mechanism, to identify data use patterns including improper sharing of data between applications, to block identified improper data exchange transactions, and/or the like. Additionally, send/receipt timelines may be processed to provide performance reports. In some cases, the API may include auditing functions that may be used to facilitate agency audits of the data exchange data and/or may be incorporated into the orchestration computing system 755 to allow the system to automatically adjust and/or identify and correct erroneous operations that would have caused the enterprise to fail an audit. In some cases, the API may include function calls that may mine data to track data that may be passed between multiple applications. In such cases, the API functions may identify sensitive data (e.g., a government identification number) that may be passed from a first application to a second application. The API function calls may then be able to search data exchange transactions where the second application may send at least a portion of the sensitive data to a third application. Such information may then be used to provide a complete transfer history for the data from a first data provider application to a last data consumer application. In some cases, the API function calls may allow the orchestration system 755 to automatically block or flag any improper data exchange transactions to unauthorized applications.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. Non-transitory computer-readable media storing instructions that, when executed by a processor, causes a centralized data manifest as a service (DMAAS) computing system to:
   retrieve, from a blockchain data store, a first data manifest comprising a first count parameter and a first hash parameter associated with a first data exchange transaction between a first computing system and a second computing system, wherein the first data manifest comprises a name of each field transferred of data of the first data exchange transaction;
   retrieve, from the blockchain data store, a second data manifest including a second count parameter and a second hash parameter, the second data manifest corresponding to a data payload of the first data exchange transaction received via a transport mechanism;
   determine, based on the first data manifest comprising the first count parameter and the first hash parameter retrieved from the blockchain data store and the second data manifest comprising the second count parameter and the second hash parameter retrieved from the blockchain data store, whether a particular data transport mechanism is capable of communicating the first data exchange transaction;
   trigger, based on an indication that a first data transport mechanism is incapable of communicating the first data exchange transaction, selection of a second data transport mechanism;
   trigger, based on analysis of the first data manifest retrieved from the blockchain data store and the second data manifest retrieved from the blockchain data store, the second computing system to release the data payload to a data consuming application when the DMAAS computing system indicates a successful transfer;
   trigger posting of an indication of successful data transfer to the blockchain data store when the DMAAS computing system indicates the data transfer completed successfully;
   trigger posting of a transaction error to the blockchain data store when the DMAAS computing system indicates a transmission error; and
   generate, based on an input received from a user device, a drill down visualization screen showing live data movement information corresponding to each data exchange transaction, wherein the drill down visualization screen identifies one or both of the first data manifest and the second data manifest, pulls information from the blockchain data store associated with one or both of the first data manifest and the second data manifest and pulls metadata identifying a plurality of data fields used for calculating a hash total.

2. The non-transitory computer-readable media of claim 1, wherein the first computing system creates a first hash value using a hashing algorithm and the second computing system creates a second hash value using the hashing algorithm.

3. The non-transitory computer-readable media of claim 1 wherein the first computing system stores the first data manifest to the blockchain data store using a first application programming interface (API) function and the second computing system stores the second data manifest to the blockchain data store using a second API function.

4. The non-transitory computer-readable media of claim 1, wherein the instructions further cause the DMAAS computing system to analyze the first data manifest and the second data manifest retrieved from the blockchain data store by causing the DMAAS computing system to:
   retrieve, via one or more application programming interface (API) functions, the first data manifest and the second data manifest from the blockchain data store;
   compare the first count parameter to the second count parameter; and
   compare the first hash parameter to the second hash parameter.

5. The non-transitory computer-readable media of claim 1, wherein the first computing system stores a first data exchange contract to the blockchain data store, the first data exchange contract defining one or more characteristics of data exchange transactions between the first computing system and the second computing system, wherein the first data manifest is generated based on the first data exchange contract.

6. The non-transitory computer-readable media of claim 5, wherein the first computing system stores the first data exchange contract to the blockchain data store using a third API function.

7. The non-transitory computer-readable media of claim 5, wherein the instructions further cause the DMAAS computing system to:
   retrieve the first data exchange contract from the blockchain data store;
   determine a comparison of a data exchange timing parameter to a measured duration of the transfer of the data payload via the transport mechanism;
   store, to the blockchain data store, an indication that the transfer of the data payload completed within a defined time limit associated with a data transfer time period when the comparison meets the data exchange timing parameter; and store, to the blockchain data store, an indication that the transfer of the data payload exceeded the defined time limit when the comparison exceeds the data exchange timing parameter.

8. The non-transitory computer-readable media of claim 5, wherein the instructions further cause the DMAAS computing system to:

adjust at least one of the data exchange timing parameter or a transport mechanism parameter as defined in a first version of the first data exchange contract if the transfer of the data payload exceeded a time limit, wherein the time limit comprises a data transfer duration and a time at which the data transfer occurs; and store a second version of the first data exchange contract to the blockchain data store, the second version of the first data exchange contract including an adjusted at least one of the data exchange timing parameter or the transport mechanism parameter.

9. A system comprising:

a first computing system comprising a first processor and a first non-transitory memory device storing instructions that, when executed by the first processor, cause the first computing system to:

generate a first data manifest comprising a first count parameter and a first hash parameter associated with a first data exchange transaction between the first computing system and a second computing system, wherein the first data manifest comprises metadata of the first data exchange transaction;

store the first data manifest to a blockchain data store;

transfer, via a transport mechanism, a data payload of the first data exchange transaction to the second computing system;

the second computing system comprising a second processor and a second non-transitory memory device storing instructions that, when executed by the second processor, cause the second computing system to:

analyze the data payload received via the transport mechanism;

generate a second data manifest including a second count parameter and a second hash parameter;

store the second data manifest to the blockchain data store; and a data manifest as a service (DMAAS) computing system comprising a third processor and a third non-transitory memory device storing instructions that, when executed by the second processor, cause the DMAAS computing system to:

determine, based on the first data manifest retrieved from the blockchain data store and the second data manifest retrieved from the blockchain data store, whether the data transport mechanism is capable of communicating the first data exchange transaction;

trigger, based on an indication that a first data transport mechanism is incapable of communicating the first data exchange transaction, selection of a second data transport mechanism;

cause transfer, after selection of the second data transport mechanism, of the first data exchange transaction via the second data transport mechanism;

trigger the second computing system to release the data payload to a data consuming application when the DMAAS computing system indicates a successful data transfer and cause posting of an indication of a successful data transfer to the blockchain data store;

cause posting of a transaction error to the blockchain data store when the DMAAS computing system indicates a transmission error; and generate, based on an input received from a user device, a drill down visualization screen that shows live data movement information corresponding to each data exchange transaction, identifies one or both of the first data manifest and the second data manifest, pulls information from the blockchain data store associated with one or both of the first data manifest and the second data manifest, and pulls metadata identifying a plurality of data fields used for calculating a hash total.

10. The system of claim 9, wherein the instructions stored in the second non-transitory memory device that, when executed by the second processor, cause the second computing system to create a hash value using a same hashing algorithm as the first computing system.

11. The system of claim 9 wherein the instructions stored in the first non-transitory memory device that, when executed by the first processor, cause the first computing system to:

store the first data manifest to the blockchain data store using a first application programming interface (API) function; and wherein the instructions stored in the first non-transitory memory device that, when executed by the first processor, cause the first computing system to:

store the second data manifest to the blockchain data store using a second API function.

12. The system of claim 9, wherein the instructions stored in the third non-transitory memory device that, when executed by the third processor, cause the DMAAS computing system to:

retrieve, via one or more application programming interface (API) functions, the first data manifest and the second data manifest from the blockchain data store;

compare the first count parameter to the second count parameter; and compare the first hash parameter to the second hash parameter.

13. The system of claim 9, wherein the instructions stored in the first non-transitory memory device that, when executed by the first processor, cause the first computing system to:

store a first data exchange contract to the blockchain data store, the first data exchange contract defining one or more characteristics of data exchange transactions between the first computing system and the second computing system, wherein the first data manifest is generated based on the first data exchange contract.

14. The system of claim 13, wherein storing the first data exchange contract to the blockchain data store comprises using a third API function.

15. The system of claim 13, wherein the instructions stored in the third non-transitory memory device that, when executed by the third processor, cause the DMAAS computing system to:

retrieve the first data exchange contract from the blockchain data store;

determine a comparison of a data exchange timing parameter to a measured duration of the transfer of the data payload via the transport mechanism;

store to the blockchain data store, an indication that the transfer of the data payload completed within a defined time limit when the comparison meets the data exchange timing parameter; and store, to the blockchain data store, an indication that the transfer of the data payload exceeded the defined time limit when the comparison exceeds the data exchange timing parameter.

16. The system of claim 15, wherein the instructions stored in the third non-transitory memory device that, when executed by the third processor, cause the DMAAS computing system to:

adjust at least one of the data exchange timing parameter or a transport mechanism parameter as defined in a first version of the first data exchange contract if the transfer of the data payload exceeded the defined time limit; and store a second version of the first data exchange contract to the blockchain data store, the second version of the first data exchange contract including an adjusted at least one of the data exchange timing parameter or the transport mechanism parameter.

17. A data manifest as a service (DMAAS) computing system comprising:

a processor;

a non-transitory computing device storing instructions that, when executed by the processor, cause the DMAAS computing system to:

store, to a blockchain data store via a first application programming interface (API) function, a first data manifest received from a first computing system, the first data manifest corresponding to a first data exchange transaction between the first computing system and a second computing system, wherein the first data manifest comprises metadata of the first data exchange transaction;

store, to the blockchain data store via a second API function, a second data manifest received from the second computing system;

determining, based on the first data manifest retrieved from the blockchain data store and the second data manifest retrieved from the blockchain data store, whether a particular data transport mechanism is capable of communicating the first data exchange transaction;

trigger, based on an indication that a first data transport mechanism is incapable of communicating the first data exchange transaction, selection of a second data transport mechanism;

cause transfer, based on an indication that the first data transport mechanism is capable of communicating the first data exchange transaction, of the first data exchange transaction via the first data transport mechanism;

cause transfer, based on an indication that the first data transport mechanism is incapable of communicating the first data exchange transaction, of the first data exchange transaction via the second data transport mechanism;

compare, via a third API function, the first data manifest to the second data manifest;

trigger, at the second computing system, import of a data payload received from the first computing system when comparison of the first data manifest to the second data manifest indicates a successful data transfer and cause posting of an indication that the first data exchange transaction between the first computing system and the second computing system completed successfully to the blockchain data store, the blockchain data store comprising an immutable record of each data exchange transaction;

cause posting of a transaction error to the blockchain data store when analysis by the DMAAS computing system indicates a transmission error; and generate, based on an input received from a user device, a drill down visualization screen corresponding to the immutable record of each data exchange transaction, wherein the drill down visualization screen identifies one or both of the first data manifest and the second data manifest and pulls information from the blockchain data store associated with one or both of the first data manifest and the second data manifest.

18. The DMAAS computing system of claim 17, wherein the instructions further cause the DMAAS computing system to:

adjust at least one of the data exchange timing parameter or a transport mechanism parameter as defined in a first version of the first data exchange contract if the transfer of the data payload exceeded a time limit; and store a second version of the first data exchange contract to the blockchain data store, the second version of the first data exchange contract including an adjusted at least one of the data exchange timing parameter or the transport mechanism parameter.

19. The DMAAS computing system of claim 17, wherein the instructions further cause the DMAAS computing system to:

retrieve the first data exchange contract from the blockchain data store;

determine a comparison of a data exchange timing parameter to a measured duration of the transfer of the data payload via the transport mechanism;

store to the blockchain data store, an indication that the transfer of the data payload completed within a defined time limit when the comparison meets the data exchange timing parameter; and store, to the blockchain data store, an indication that the transfer of the data payload exceeded the defined time limit when the comparison exceeds the data exchange timing parameter.

20. The DMAAS computing system of claim 17, wherein the instructions further cause the DMAAS computing system to:

retrieve, via one or more application programming interface (API) functions, the first data manifest and the second data manifest from the blockchain data store;

compare a first count parameter of the first data manifest to a second count parameter of the second data manifest; and compare a first hash parameter of the first data manifest to a second hash parameter of the second data manifest.

* * * * *

UNITED STATES PATENT AND TRADEMARK OFFICE
CERTIFICATE OF CORRECTION

PATENT NO. : 11,599,555 B2
APPLICATION NO. : 17/493939
DATED : March 7, 2023
INVENTOR(S) : Patangia et al.

Page 1 of 1

It is certified that error appears in the above-identified patent and that said Letters Patent is hereby corrected as shown below:

In the Claims

Column 32, Line 21:
In Claim 1, after "manifest", insert --,--

Column 35, Line 37:
In Claim 17, delete "determining," and insert --determine,-- therefor Signed and Sealed this
Twenty-seventh Day of August, 2024

Katherine Kelly Vidal
*Director of the United States Patent and Trademark Office*